US008667386B2

(12) United States Patent
Bannoura et al.

(10) Patent No.: US 8,667,386 B2
(45) Date of Patent: Mar. 4, 2014

(54) NETWORK CLIENT OPTIMIZATION

(75) Inventors: Daniel L. Bannoura, Frisco, TX (US);
Gyorgy Bozoki, Plano, TN (US)

(73) Assignee: Netcordant, Inc., Plano, TX (US)

( * ) Notice: Subject to any disclaimer, the term of this patent is extended or adjusted under 35 U.S.C. 154(b) by 489 days.

(21) Appl. No.: 12/944,352

(22) Filed: Nov. 11, 2010

(65) Prior Publication Data
US 2012/0124488 A1   May 17, 2012

(51) Int. Cl.
*G06F 17/00* (2006.01)

(52) U.S. Cl.
USPC ............................................. 715/234

(58) Field of Classification Search
USPC .................. 715/234, 235, 236, 237
See application file for complete search history.

(56) References Cited

U.S. PATENT DOCUMENTS

| 7,610,588 | B1 * | 10/2009 | Hager et al. ............ 719/317 |
| 8,359,542 | B2 * | 1/2013 | Dingeman et al. .......... 715/771 |
| 2005/0278698 | A1 * | 12/2005 | Verco ................... 717/116 |
| 2007/0100967 | A1 * | 5/2007 | Smith et al. ............ 709/219 |
| 2007/0300244 | A1 | 12/2007 | Kieffer |
| 2008/0172662 | A1 | 7/2008 | Harris et al. |
| 2009/0024982 | A1 | 1/2009 | Diep et al. |
| 2009/0055811 | A1 | 2/2009 | Presler-Marshall et al. |
| 2009/0248622 | A1 * | 10/2009 | Zhang et al. ............ 707/2 |
| 2009/0292677 | A1 * | 11/2009 | Kim .................... 707/3 |
| 2009/0327848 | A1 * | 12/2009 | Glazer et al. ........... 715/201 |
| 2010/0088619 | A1 * | 4/2010 | Rath et al. ............. 715/764 |
| 2012/0110515 | A1 * | 5/2012 | Abramoff et al. ......... 715/854 |

OTHER PUBLICATIONS

Korean Intellectual Property Office, International Search Report for PCT/US2011/060254, mailed May 22, 2012, 12 pages.

* cited by examiner

*Primary Examiner* — Laurie Ries
(74) *Attorney, Agent, or Firm* — Haynes and Boone, LLP

(57) ABSTRACT

A method of rendering an optimized web page or other resource includes requesting a resource and receiving a response including a user interface control declaration and a data array containing properties for the user interface control. The data array is parsed to produce a first property value, and a property of the user interface control is modified to correspond to the first property value. Alternatively, the response may not include a user interface control declaration, but a user interface control may be instantiated having a property that corresponds to the first property value. The property value may have been determined dynamically based at least in part on information provided with the request.

9 Claims, 21 Drawing Sheets

```
<asp:Menu ID="MainMenu" runat="server" StaticDisplayLevels="3">
  <Items>
    <asp:MenuItem text="Main">
      <asp:MenuItem text="About us"
                    navigateurl="About.aspx"></asp:MenuItem>
      <asp:MenuItem text="Contact us"
                    navigateurl="Contact.aspx"></asp:MenuItem>
    </asp:MenuItem>
    <asp:MenuItem text="Technologies">
      <asp:MenuItem text="Web"
                    navigateurl="Webtech.aspx"></asp:MenuItem>
      <asp:MenuItem text="Print"
                    navigateurl="Printtech.aspx"></asp:MenuItem>
      <asp:MenuItem text="Audio"
                    navigateurl="Audiotech.aspx"></asp:MenuItem>
    </asp:MenuItem>
  </Items>
</asp:Menu>
```

Fig. 4

```
<ul id="MainMenu">
  <li>Main
    <ul>
      <li><a href="About.aspx">About us</a></li>
      <li><a href="Contact.aspx">Contact us</a></li>
    </ul>
  </li>
  <li>Technologies
    <ul>
      <li><a href="Webtech.aspx">Web</a></li>
      <li><a href="Printtech.aspx">Print</a></li>
      <li><a href="Audiotech.aspx">Audio</a></li>
    </ul>
  </li>
</ul>
```

Fig. 5

```
ControlDefinition.XML                                              800

<textbox>

<properties>

<count>15</count>

<property id=0>TextMode</property>
        <property id=1>FGColor</property>
        <property id=2>BGColor</property>
        <property id=3>FGColor</property>
        <property id=4>Text</property>
        <property id=5>Enabled</property>

. . .

<property id=22>BorderWidth</property>

</properties>

</textbox>
```

Fig. 8

```
Original Code                                                      700

Control_OnChangeEvent()
{
    string text = Control.GetText();
    if( text == "" )
    {
        Control.SetBackgroundColor( Color.Red );
        Control.SetFontStyle( Style.Bold );
        Control.SetText( "Please enter a value" );
    } else {
        Database.updateRecords( text );
        Control.Clear();
    }
}
```

```
Optimized Code                                                     702

EkkoControl_OnChangeEvent()
{
    string text = ControlString[ 1 ];
    if( text == "" )
    {
        ControlString[ 2 ] = "ff0000";
        ControlString[ 3 ] = "bold";
        ControlString[ 4 ] = "Please enter a value";
    } else {
        Database.updateRecords( text );
        ControlString[ 4 ] = "";
    }
}
```

1204 → Control1.Text = "Please enter a value";

1206 →
```
L_003e: ldarg.0
L_003f: ldfld class [System.web]System.Web.UI.WebControls.Label _Default::Control1
L_0044: ldstr "Please enter a value"
L_0049: callvirt instance void [System.Web]System.Web.UI.WebControls.Label::set_Text(string)
```

1902 →
```
         ldarg.0
1904  {  ldfld class [System.web]System.Web.UI.WebControls.Label _Default:: [var_name]
         ...
         [n-lines]
         ...
1906  {  callvirt instance void
         [System.Web]System.Web.UI.WebControls.Label::set_Text(string)
```

1908 ↗
1910 ↗
1912 ↗
1914 ↗

| Stack Count | Stack Increment | Stack Location | Instruction |
|---|---|---|---|
| 2 | 0 | L_0000 | ldarg.0 |
| 3 | +1 | L_0002 | ldfld class [System.Web]System.Web.UI.WebControls.Label _Default::Control1 |
| 4 | +1 | L_0004 | ldstr "Please enter a value" |
| 2 | -2 | L_0006 | callvirt instance void [System.Web]System.Web.UI.WebControls.Label::set_Text(string) |

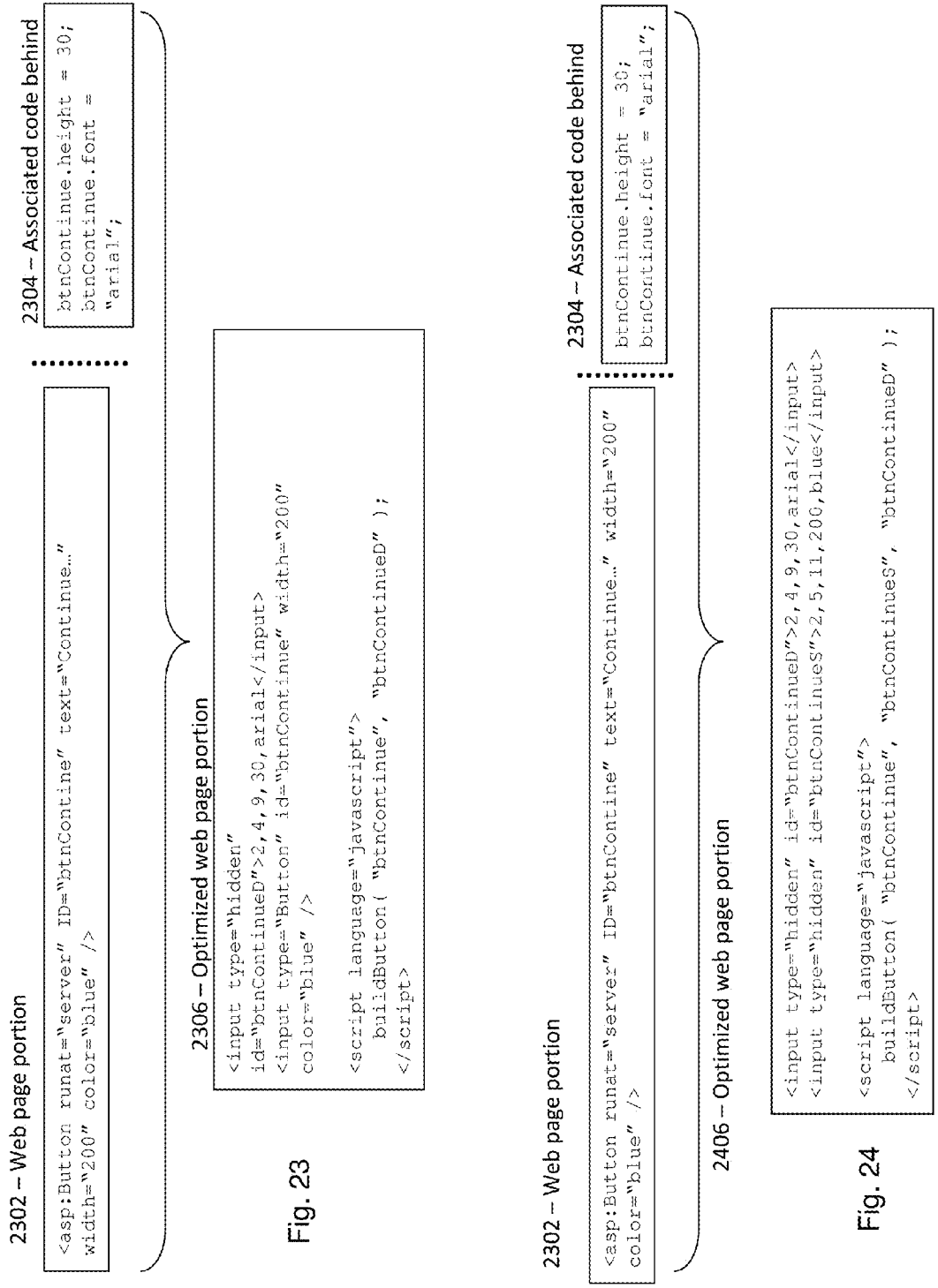

NETWORK CLIENT OPTIMIZATION

RELATED APPLICATIONS

The following co-pending patent applications, filed on date even herewith, are hereby incorporated by reference for all purposes:
1. Ser. No 12/944,340, entitled "Web Application Optimization" by Daniel L. Bannoura and Gyorgy Bozoki.
2. Ser. No. 12/944,365, entitled "Optimization of Compiled Control Objects" by Daniel L. Bannoura, Gyorgi Bozoki and Justin Collins.

BACKGROUND

The World Wide Web provides a convenient platform for sharing information. Among the many services offered through web sites are banking, shopping, and e-mail. In order to provide better services, many companies now provide customized web pages to each visitor. The customizations include examples such as providing a weather report based on a visitor's location, selecting targeted advertisements, and providing access to a visitor's account with the web site. Because each web page sent to a visitor is customized, the web server hosting the web site must create each customized page on demand, as it is requested by a visitor. Thus, providing customized web pages can put a strain on the processing resources of the web server. The increasing popularity of web pages also increases the traffic load on network resources that send and receive web pages.

SUMMARY

In one embodiment, a method includes requesting a resource and receiving a response including a user interface control declaration and a data array containing properties for the user interface control. The data array is parsed to produce a first property value, and a property of the user interface control is modified to correspond to the first property value.

In another embodiment, a method includes requesting a resource and receiving a response including a data element that includes a set of properties for a user interface control. The data element is parsed to produce a property value, and a user interface control is instantiated having a property that corresponds to the property value.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

FIGS. 4 and 5 illustrate two examples of a menu structure.

FIG. 7 illustrates an example .NET control section and associated code behind page.

FIG. 8 illustrates an exemplary mapping for some of the properties of a textbox control.

FIG. 19 illustrates an example approach to modifying a compiled CIL program.

FIG. 23 illustrates an example of optimizing a control.

FIG. 24 illustrates another example of optimizing a control.

DETAILED DESCRIPTION

The present disclosure relates generally to the world wide web and a method of improving web pages and web-based applications. It is understood, however, that the following disclosure provides many different embodiments, or examples, for implementing different features of the invention. Specific examples of components and arrangements are described below to simplify the present disclosure. These are, of course, merely examples and are not intended to be limiting.

Figure 1:
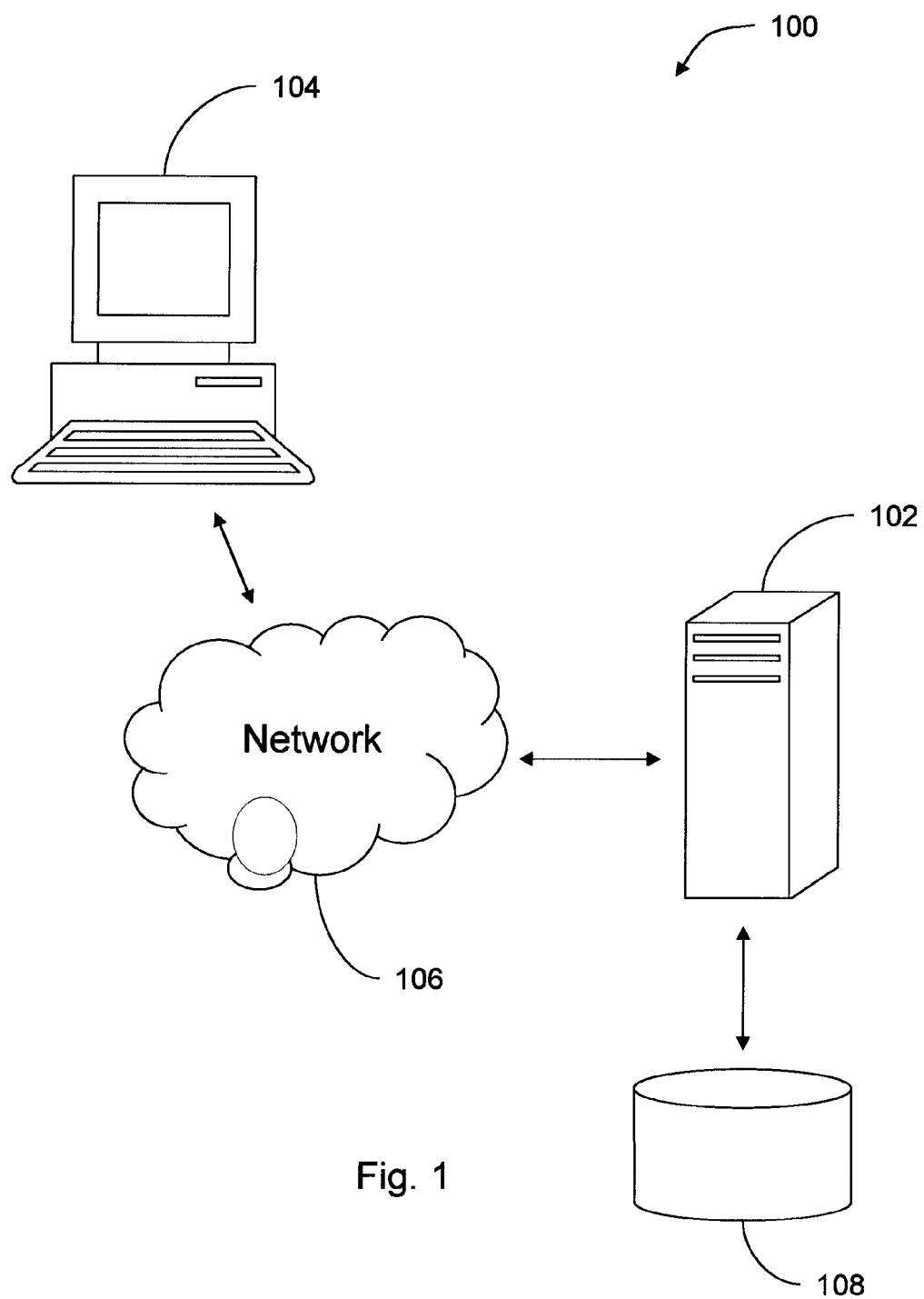
FIG. 1 illustrates a system for implementing web application optimization.

Referring to FIG. 1, illustrated is system 100 for implementing web page optimization technology. The system includes a server computer 102 that provides access to a web application by producing and transmitting documents such as web pages. The server computer 102 may execute web server software that receives web page requests and responds to the requests by transmitting web pages. Example web server software includes Internet Information Server available from Microsoft and Apache available from the Apache Software Foundation. In responding to requests, the web server software selects a source file that is used to produce the requested web page. The source file may be a web page or web page template file. The source file may include executable or interpretable code, and it may refer to a separate file containing executable or interpretable code. In some embodiments, the code may access data stored in a database 108. The database 108 may be a SQL database, a file system, a graph database, or any other suitable database. Example database software includes Microsoft SQL Server, Oracle Database, and PostgreSQL. The database 108 may be located on the server computer 102, on another computer, or on group of computers. The web server software executes portions of the code and sends the produced web page to a client computer 104.

The client computer 104 is coupled to the server computer 102 through a network 106. The client computer 104 executes web browser software that allows a user to access the web application, for example by requesting a web page from the server computer 102 and displaying the received web page to a user. The web browser software may also execute portions of the received web page. Examples of web browser software include Microsoft Internet Explorer, Apple Safari, Mozilla Firefox, and Google Chrome. The network 106 provides a communication pathway between the client computer 104 and the server computer 102.

The network 106 may include multiple wired or wireless connections, and zero or more additional computers may be present in the communication pathway between the client computer 104 and the server computer 102. The network 106 may include an electrical connection, an optical connection, a radio frequency connection, any other suitable communication connection, or a combination of multiple connections. The network 106 may include equipment such as switches, routers, hubs, multiplexers, demultiplexers, modulators, demodulators, and other suitable equipment. Alternately, the network 106 may be a virtual connection in the case of a loopback interface or virtualization software that allows the web browser software and the web server software to execute on the same computer hardware. The network 106 may also include additional clients and servers that are not illustrated. Examples of a network 106 include an internet such as the public Internet, an intranet such as a private corporate network.

In other embodiments, documents other than web pages may be requested and transmitted by the client 104 and server 102. For example, the documents may be XML documents, JSON documents, or a combination of different document types or formats.

The client 104, server 102, and database 108 may include one or more devices (not illustrated) for storing data to and retrieving data from a computer readable medium. The devices may be incorporated into one or more of the client 104, server 102, and database 108, or they may be attached either directly or indirectly, or they may be accessible over a network or data bus, or any combination of these. Example devices include registers, volatile memory such as random access memory, and nonvolatile memory such as a hard drive or optical drive. It is understood that storing data, which is generally binary in nature, to any of these computer readable media requires a transforming the state of a physical article. For example, storing a data bit to a register or to RAM generally involves charging or discharging a capacitor or setting the state of a flip-flop. Storing a data bit to magnetic media generally involves changing the magnetization of one or more grains within the magnetic medium. Storing a data bit to an optical disc generally involves scorching an organic dye or changing the phase of a metal alloy. Thus, storing a data bit to a computer readable medium involves updating a physical article so that it contains a representation of the stored data bit. Storing larger or more complex data is achieved by storing all of its constituent bits, whether sequentially or simultaneously or both. References to computer memory or other storage devices throughout are intended to cover any suitable computer readable medium.

Figure 2:
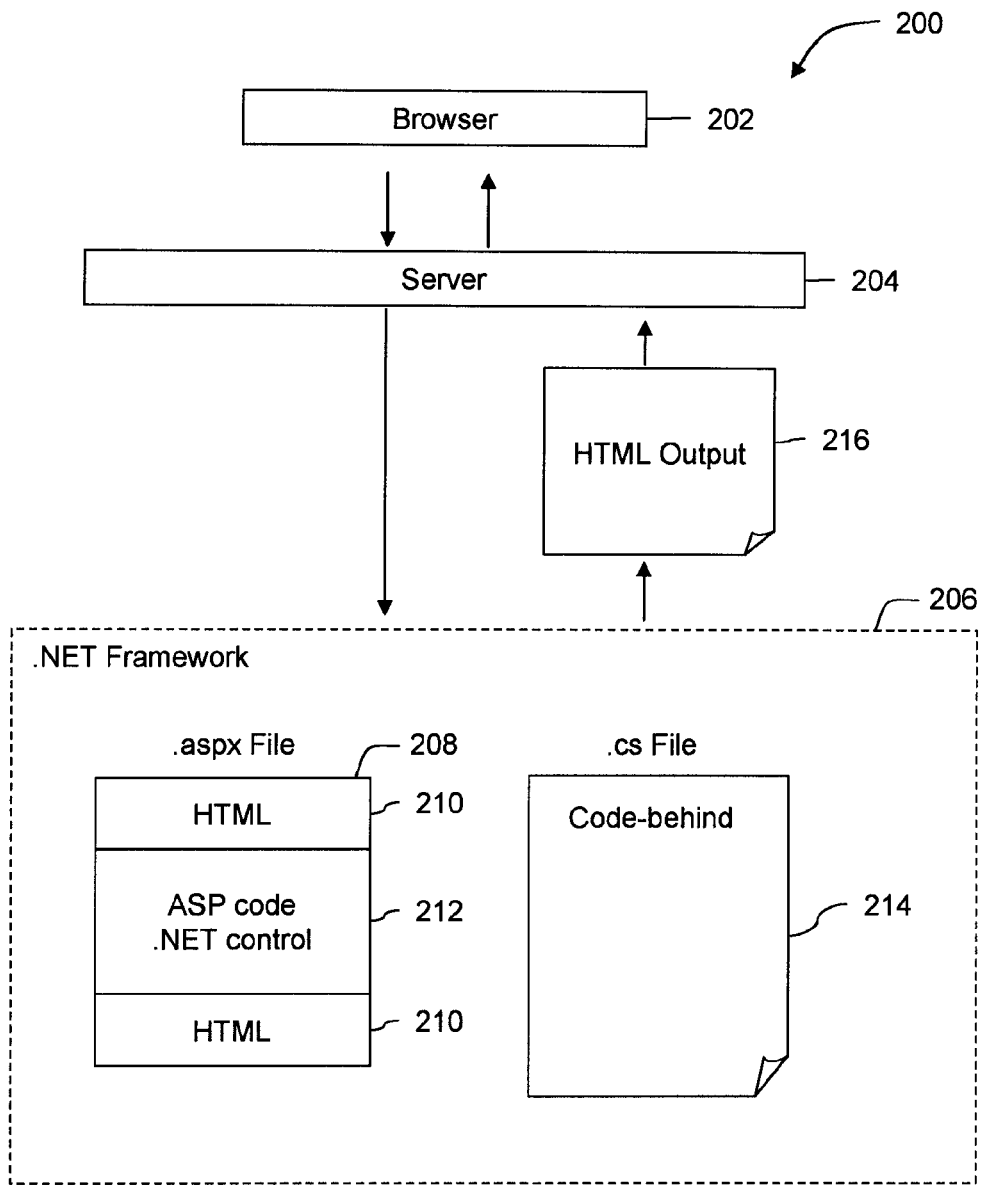
FIG. 2 illustrates an exemplary system for delivering a service or a document to a user.

Turning now to FIG. 2, illustrated is an exemplary system 200 for delivering a service or a document to a user. In many instances the user is an individual, but the user may also be a computer, service, process, controller, or any other type of user. The user uses a client program, illustrated as web browser 202, to initiate a request for information, such as a web page, XML response, or other document. An example of a request is an HTTP GET or POST message. The request is sent to a server program, illustrated as a web server 204, although other types of servers are also possible. In the specific example of FIG. 2, the web server 204 is a computer running Microsoft Internet Information Server (IIS), but other server or web server software are also contemplated. The web server passes the request to an application framework 206, illustrated as the object-oriented .NET Framework available from Microsoft although other application frameworks, including both object-oriented and non-object-oriented application frameworks, are also contemplated. Within the application framework 206, the request is identified as a request for a specific web page 208, illustrated in this example as a web page labeled "Products.aspx." It is understood that the request may also identify an object, procedure, or command for producing a web page or other suitable response to the request. As illustrated, the web page 208 is a server-side executable program that includes any number of sections of HTML 210 and server scripting 212. The sections of HTML 210 may optionally include additional non-HTML content, such as JavaScript code, comments, or other content. The server scripting 212 may identify or define objects, such as .NET controls, for producing a relevant portion of the response. The web page 208 as illustrated has an associated code-behind page 214, which may be shared with other web pages. It is understood that some web pages, or parts of web pages, may not have an associated code-behind page. The code-behind page 214 includes additional server-side executable code used in generated a response to the request from web browser 202. The code-behind page 214 may be written in any suitable language, including for example Visual Basic or C#, and may be compiled before or during execution.

In response to the received request from the server 204, the application framework 206 renders the web page 208 to produce a response, illustrated as an HTML output 216. In rendering the web page 208, the application framework 206 executes the instructions in the server scripting 212, which may cause the instantiation of one or more objects corresponding to the .NET controls in server scripting 212. The application framework 206 may also execute functions, procedures, and/or methods in the code-behind page 214, which may in turn cause the instantiation of additional objects. The instantiated objects may produce some or all of the contents of the HTML output 216. The HTML output 216 may be specifically tailored to the received request, for example, by incorporating information about the user, for example, the user's name, location, or account. After the output 216 is produced, the application framework 206 provides the output 216 to the web server 204, which in turn sends the output 216 to the web browser 202 where it is produced for the user.

Figure 3:
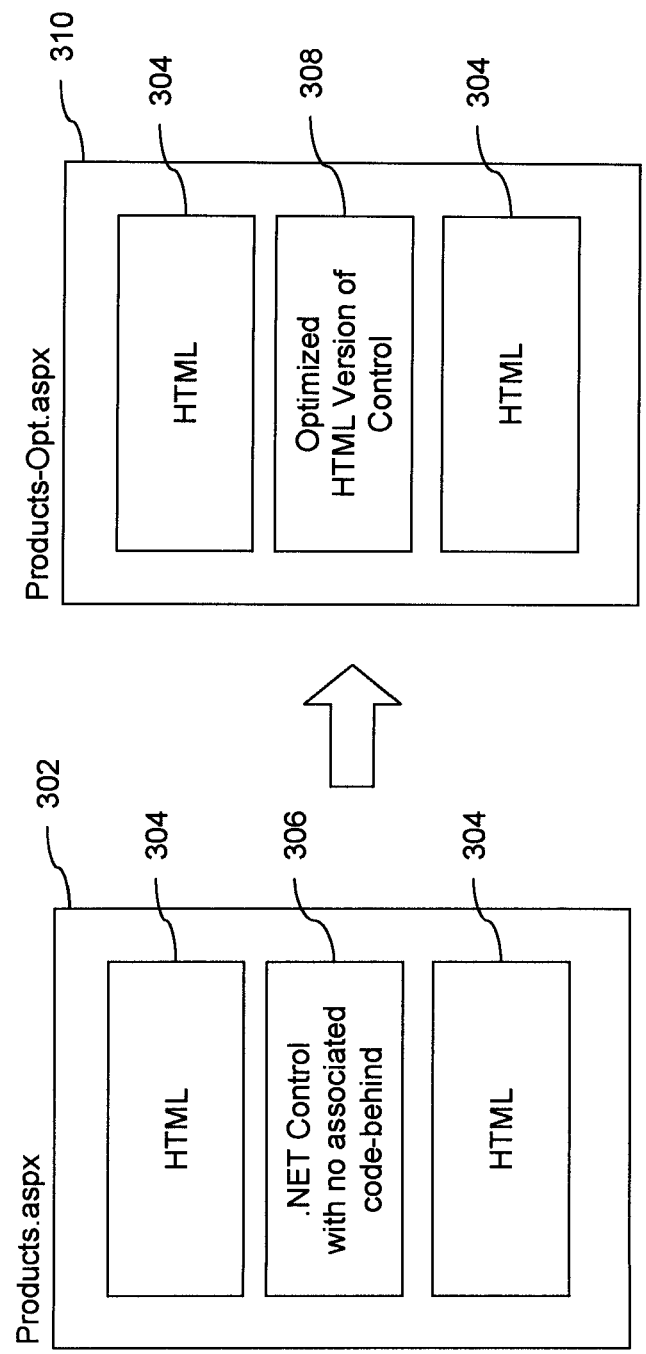
FIG. 3 illustrates an optimization technique for part of a network application that produces a static output.

FIG. 3 illustrates an optimization technique 300 for part of a network application that produces a static output. Although the example of FIG. 3 is illustrated using the ASP.NET platform available from Microsoft Corp., it is understood that other technology platforms could be used instead or in addition.

The network application includes an exemplary web page 302 named Products.aspx. The web page 302 includes various sections of HTML code 304 and a .NET control section 306. The .NET control section 306 in this example does not have an associated code behind page. An example .NET control section with no associated code behind page is illustrated in a code segment 400 in FIG. 4, which illustrates an example of a menu structure designed using asp:Menu and asp:MenuItem objects.

Rendering the Products.aspx web page in the standard .NET framework causes the instantiation of all of the asp:Menu and asp:MenuItem objects defined in the code segment 400 of FIG. 4. But the HTML output of these objects is always the same. Thus, when a client requests the Products.aspx page, the processing required to produce a response is reduced by substituting a static HTML 308 output for the corresponding .NET control section 306. An example HTML output is illustrated in an HTML segment 500 in FIG. 5. The resulting web page 310, in this illustrative example, includes only HTML and has no .NET controls. Thus, rendering the web page 310 does not require the instantiation of any .NET objects. Those of skill in the art will recognize that in some instances, a .NET control section 306 may be replaced with a combination of HTML and client-side executable code, such as JavaScript.

Figure 6:
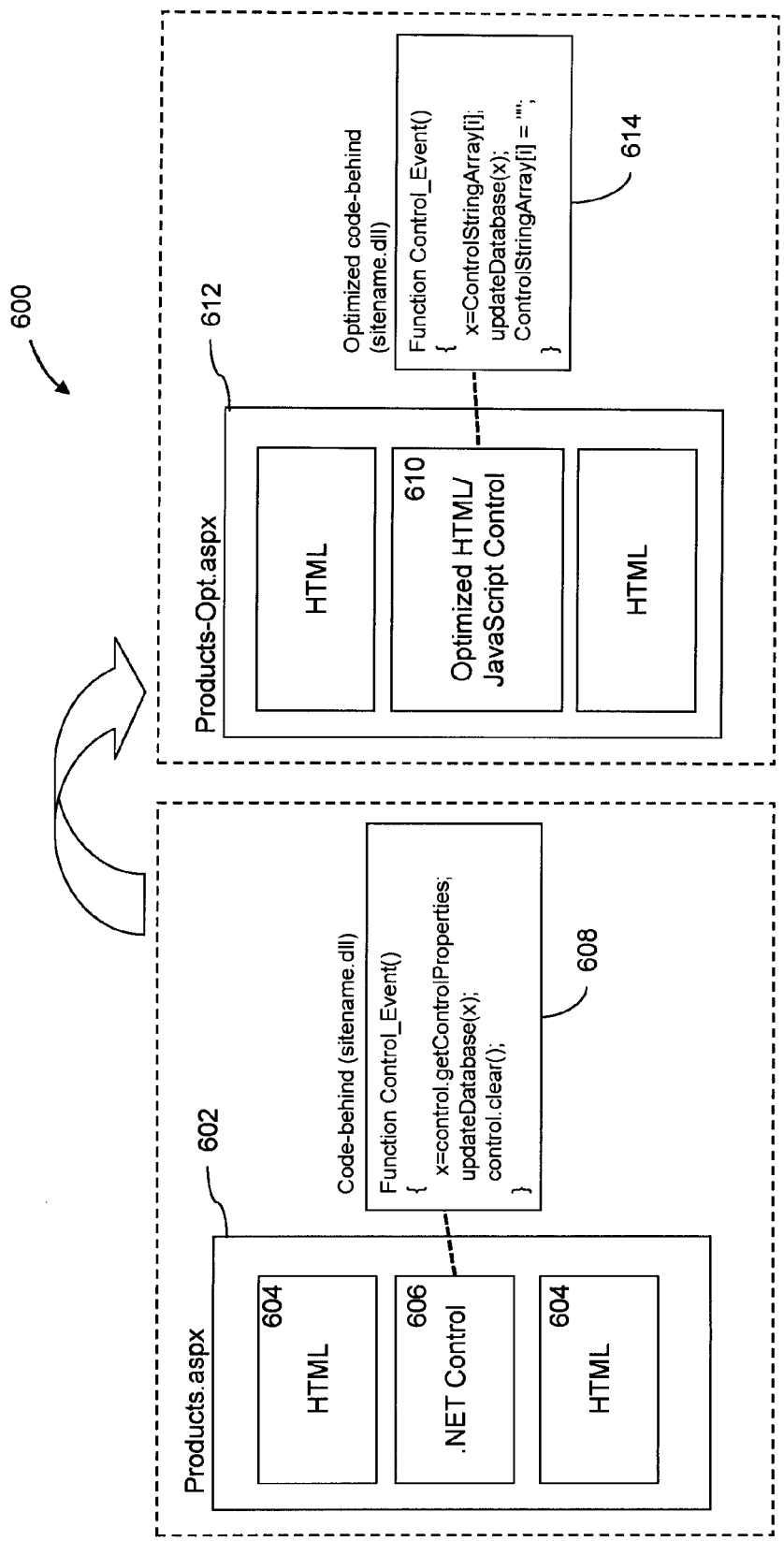
FIG. 6 illustrates an optimization technique for part of a network application that produces a dynamic output.

FIG. 6 illustrates an optimization technique 600 for part of a network application that produces a dynamic output. Although the example of FIG. 6 is illustrated using the ASP.NET platform available from Microsoft Corp., it is understood that other technology platforms could be used instead or in addition.

The network application includes an exemplary web page 602 named Products.aspx. The web page 602 includes various sections of HTML code 604 and a .NET control section 606. The .NET control section 606 in this example has an associated code behind page 608 named Sitename.dll. An example .NET control section and associated code behind page is illustrated in code segments 700 and 702, respectively, in FIG. 7.

Rendering the Products.aspx web page in the standard .NET framework causes the instantiation of the object or objects defined in the .NET control section 606. Rendering may also cause the execution of the corresponding code behind, such as some or all of the code segment 700 of FIG. 7. The code behind code segment 700 accesses an object's functionality, properties, and events through various methods associated with the object. Execution of these methods at runtime requires first locating the appropriate class associated with the object, then locating the called method for that class or a superclass, and then finally executing the corresponding instructions of the method. In an application framework such as .NET, it is common for objects to be arranged in a hierarchy to exploit the advantages commonly associated with object-oriented programming, such as inheritance, encapsulation, and abstraction. Thus, even executing a relatively simple method such as a "getText" or "setText" method may require many instructions at runtime.

Accordingly, the optimization technique 600 includes substituting an optimized web page 612 for the web page 602. The optimized web page 612 includes an optimized control section 610 in place of the .NET control section 606 used in web page 602. The optimized control section 610 causes the instantiation of one or more optimized objects corresponding to the object or objects instantiated by the .NET control section 606. The optimized objects are of an optimized control class that represents all control properties as a simple array, such as a string array or a data array. This prevents unnecessary function calls, object accesses, and object hierarchy overhead. Alternately, the optimized control section 610 may use only HTML, JavaScript, or a combination of both to create a corresponding control object, thus eliminating the need to instantiate any corresponding objects during execution or rendering. Corresponding changes are made to the code behind code segment, as shown in FIG. 7. Code segment 702, corresponding to the optimized code behind code segment 614, stores and accesses various control properties in a string array named ControlString. For example, the control's text may be stored as ControlString[1], the background color as ControlString[2], and the font style as ControlString[3].

Thus, executing the OnChangeEvent( ) of code segment 702, as compared to executing the code segment 700, does not require finding or executing any methods associated with storing or retrieving control properties. Instead, the properties can be set and accessed through direct memory accesses to a string array.

Accessing a control's properties through a string or other array generally requires a mapping to ensure that the array elements are used consistently throughout an application. FIG. 8 illustrates an exemplary mapping 800 for some of the properties of a textbox control. As illustrated, the mapping is written as an XML document, but it is understood that the mapping may be in any format.

When the web page 612 is rendered in response to a client request, the optimized control section 610 may produce an HTML output similar to or the same as the .NET control section 606. Alternatively, the produced output to be in an alternate format that is more memory efficient. In particular, it is noted that an HTML output for an input text field includes various delimiters such as <input> and </input> tags, thus adding at a minimum fifteen additional characters of output for every input text field in the output. Additional delimeters may also be part of an HTML output. Thus, it is preferred for the optimized control section 610 to produce a more compact output format that includes all of the necessary contents without unnecessary delimiter characters. An example of such a format is explained more fully below.

The output may additionally include instructions executable by a client to reformat the alternate format output to an HTML format. The client-side executable instructions may be a JavaScript routine. Optionally, the output may include a reference to such instructions, such as a JavaScript function call, while the detailed instructions themselves are accessed from another location, such as a separate JavaScript file. After the output is returned to the client, the JavaScript routine is executed by the client and results in creating an HTML output using the provided data and properties. The HTML output can then be rendered by the client. Because the alternate format output does not include all of the mark-up tags associated with a fully-tagged HTML output, the size of the optimized output produced by optimized control section 610 may be less than a corresponding HTML output produced by the .NET control section 606.

Figure 9:
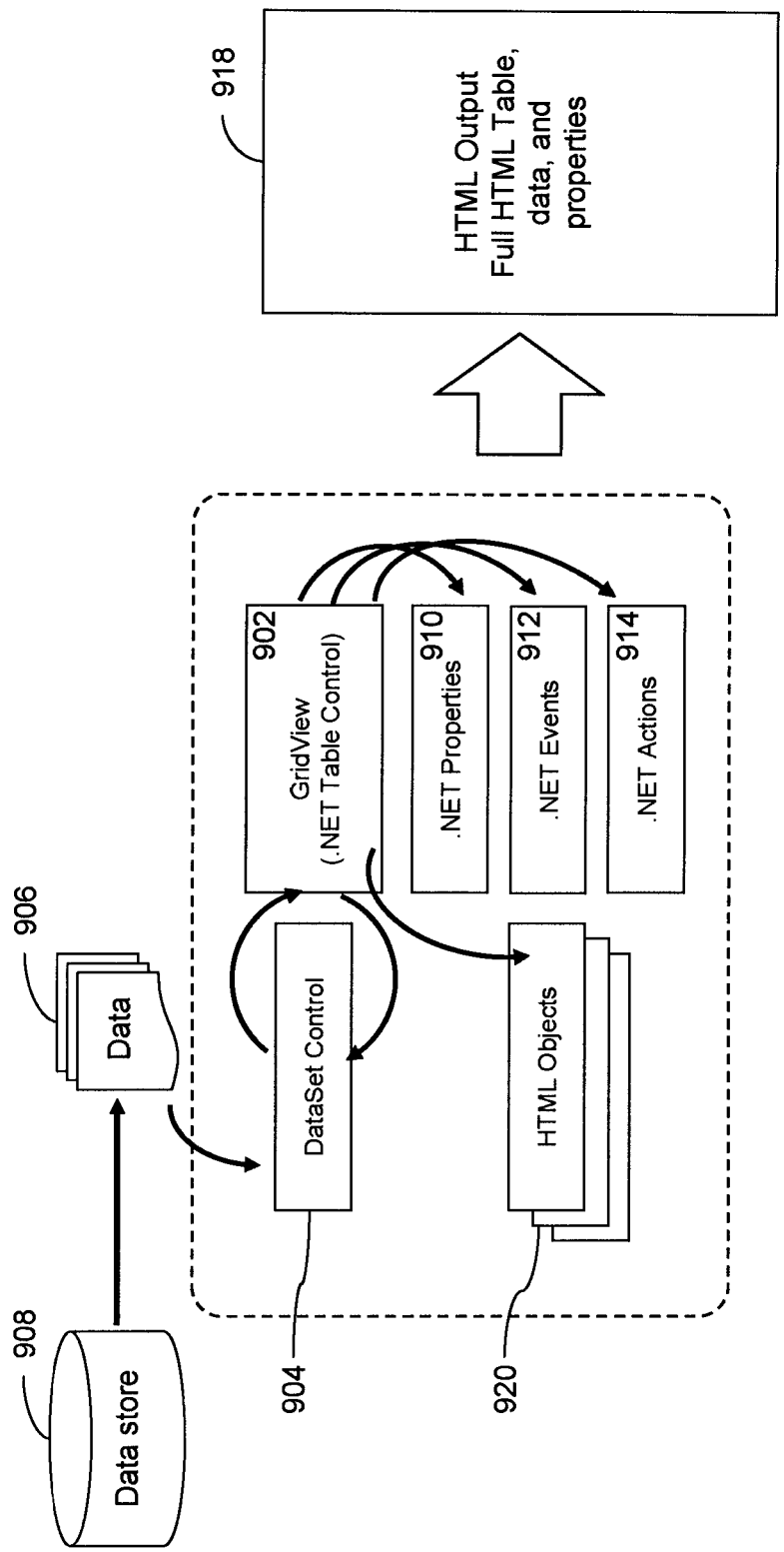
FIG. 9 illustrates an object-oriented network application that produces information in a table format.

The techniques described above can be applied to substantially any control. The inventors have discovered, however, that certain controls (including, for example, controls that produce table-formatted output) can be optimized even more effectively with the following approach. FIG. 9 illustrates an object-oriented network application 900 that produces information in a table format. Although the example of FIG. 9 is illustrated using the ASP.NET platform available from Microsoft Corp., it is understood that other technology platforms, whether object-oriented or non-object-oriented, could be used instead or in addition.

The network application 900 instantiates a GridView object 902, which in the .NET framework is a control object for producing a tabular output. Those of skill in the art will recognize that other controls could also be used, and that the output may or may not be tabular. The control object may be any kind of control or object, and the control object may or may not produce a visible output. For example, the control object may be a property object, such as a color object. The GridView object 902 either instantiates or communicates with a DataSet control 904, which provides an interface to a data store 906, such as a file or database. The DataSet control 904, in turn, retrieves raw data 908 from the data store 906 and then provides the data to GridView object 902.

The GridView object 902 is customizable by a programmer through various properties 910, events 912, actions 914, and customizations 916. These elements allow the programmer to expand or tailor the functionality of the GridView object 902 to meet the requirements of the network application. During the execution of various events 912 and actions 914, additional objects may be instantiated. In particular, during the rendering of the GridView object 902 to produce an HTML output 918, a variety of additional HTML objects 920 may be instantiated. It is well understood that other objects (not illustrated) may also be instantiated during this processing, and that the output may be in another document format, including for example an XML document, a JSON document, or other type of document.

Figure 10:
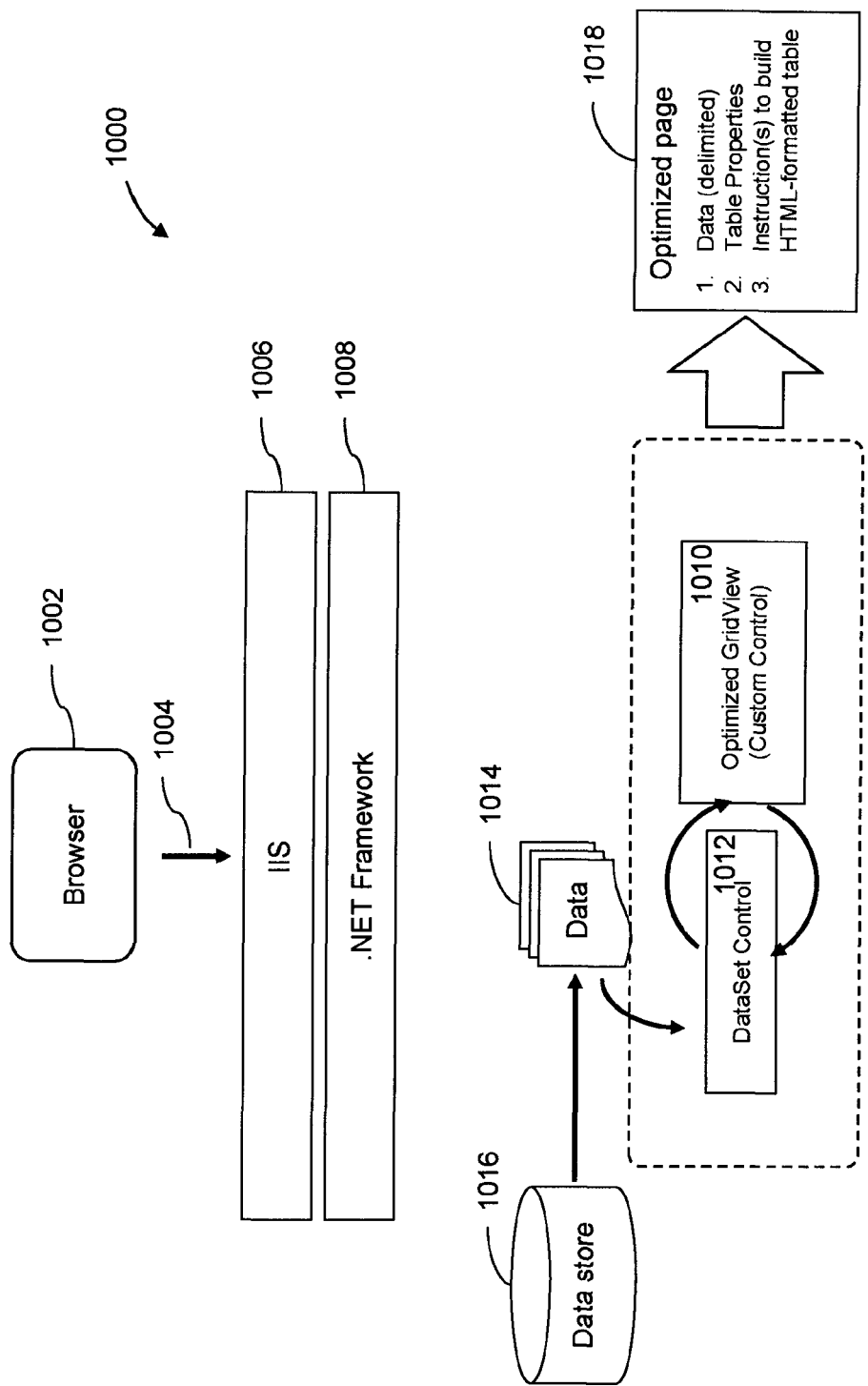
FIG. 10 illustrates an alternate framework for providing an object-oriented network application that displays information in a table format.

FIG. 10 illustrates an alternate framework 1000 for providing an object-oriented network application that displays information in a table format. Like FIG. 9, FIG. 10 is illustrated using the ASP.NET platform available from Microsoft Corp., but it is understood that other technology platforms, whether object-oriented or non-object-oriented, could be used instead or in addition.

The framework 1000 includes a OptimizedGridView object 1010. Like the GridView object 902 of FIG. 9, the OptimizedGridView object 1010 is a control object for producing tabular output. But as will be further illustrated below, the OptimizedGridView object 1010 produces a substantially similar or functionally equivalent output while consuming considerably fewer execution and memory resources. More specifically, the instantiation and rendering of an OptimizedGridView object 1010 causes the instantiation of fewer additional objects, or perhaps even does not directly cause the instantiation of any additional objects. In some embodiments, the OptimizedGridView object 1010 may provide a subset of the features available with the GridView object 902. For example, the OptimizedGridView object 1010 may implement only the most commonly used features and capabilities of the GridView object 902. In addition, the OptimizedGridView object 1010 may provide features not available with the GridView object 902. Thus, the OptimizedGridView object 1010 may provide a suitable replacement object for applications using the GridView object 902.

The OptimizedGridView object 1010 either instantiates or communicates with a DataSet control 1012, which provides an interface to a data store 1016, such as a file or database. The DataSet control 1012, in turn, retrieves raw data 1014 from the data store 1016 and then provides the data to OptimizedGridView object 1010. Thus, the OptimizedGridView object 1010 is able to access all of the same data stores, and through substantially similar mechanisms, as the GridView object 902.

The OptimizedGridView object 1010 retrieves the data 1014 through the DataSet Control 1012 and formats the data for presentation as the output 1018. The OptimizedGridView object 1010 preferably produces the output 1018 with a minimum of additional object instantiations. And while the OptimizedGridView object 1010 may produce an HTML output similar or the same as HTML output 918 produced by the GridView object 902, it is preferred for the produced output to be in an alternate format that is more memory efficient. In particular, it is noted that an HTML table output delimits each data element with <td> and </td> tags, thus adding at a minimum nine additional characters of output for every data element within the table. Additional delimeters, such as <tr> and <th> tags (and their corresponding closing tags), may also be part of an HTML table output. Thus, it is preferred for the OptimizedGridView object 1010 to produce a more compact output format that includes all of the necessary table contents without unnecessary delimiter characters. An example of such a format is explained more fully below.

The output 1018 may additionally include instructions executable by a client to reformat the output 1018 to an HTML format. The client-side executable instructions may be a JavaScript routine. Optionally, the output 1018 may include a reference to such instructions, such as a JavaScript function call, while the detailed instructions themselves are accessed from another location, such as a separate JavaScript file. After the output 1018 is returned to the client, the JavaScript routine can create an HTML table output using the provided table data and table properties. The HTML table can then be rendered by the client. Because the output 1018 does not include all of the mark-up tags associated with an HTML table, the size of the output 1018 is less than a corresponding HTML output 918 in FIG. 2.

It can be appreciated that the framework 1000 enjoys a number of advantages over the application 900. First, instantiation and use of the OptimizedGridView object 1010 requires fewer processing and memory resources when compared with the GridView 902. Because fewer objects are created and destroyed, there is a substantial savings in memory usage. And because the OptimizedGridView object 1010 avoids the use of many objects, those objects' initialization and clean-up routines do not have to be executed, resulting in a reduction in processing time. And since the output of OptimizedGridView object 1010 is smaller than the output of GridView 902, less communication bandwidth is needed to transmit the response back to the requester.

Thus, the framework 1000 can respond to requests using fewer memory, processing, and communication resources. Because of this increased efficiency, the framework 1000 can handle more requests than the application 900 using the same or equal hardware.

The example of FIG. 10 is not limited to handling only table-style controls such as a .NET GridView. The same similar approach can be taken with other .NET controls by replacing a standard .NET control with an optimized replacement that provides some or all of the same functionality but with higher efficiency. Examples of other .NET controls that can be replaced include validation controls, menu controls, list controls, and other controls. Furthermore, it is understood that the example of FIG. 10 is also not limited to .NET controls, but could be adapted to any other application framework, whether object-oriented or non-object-oriented.

Figure 11:
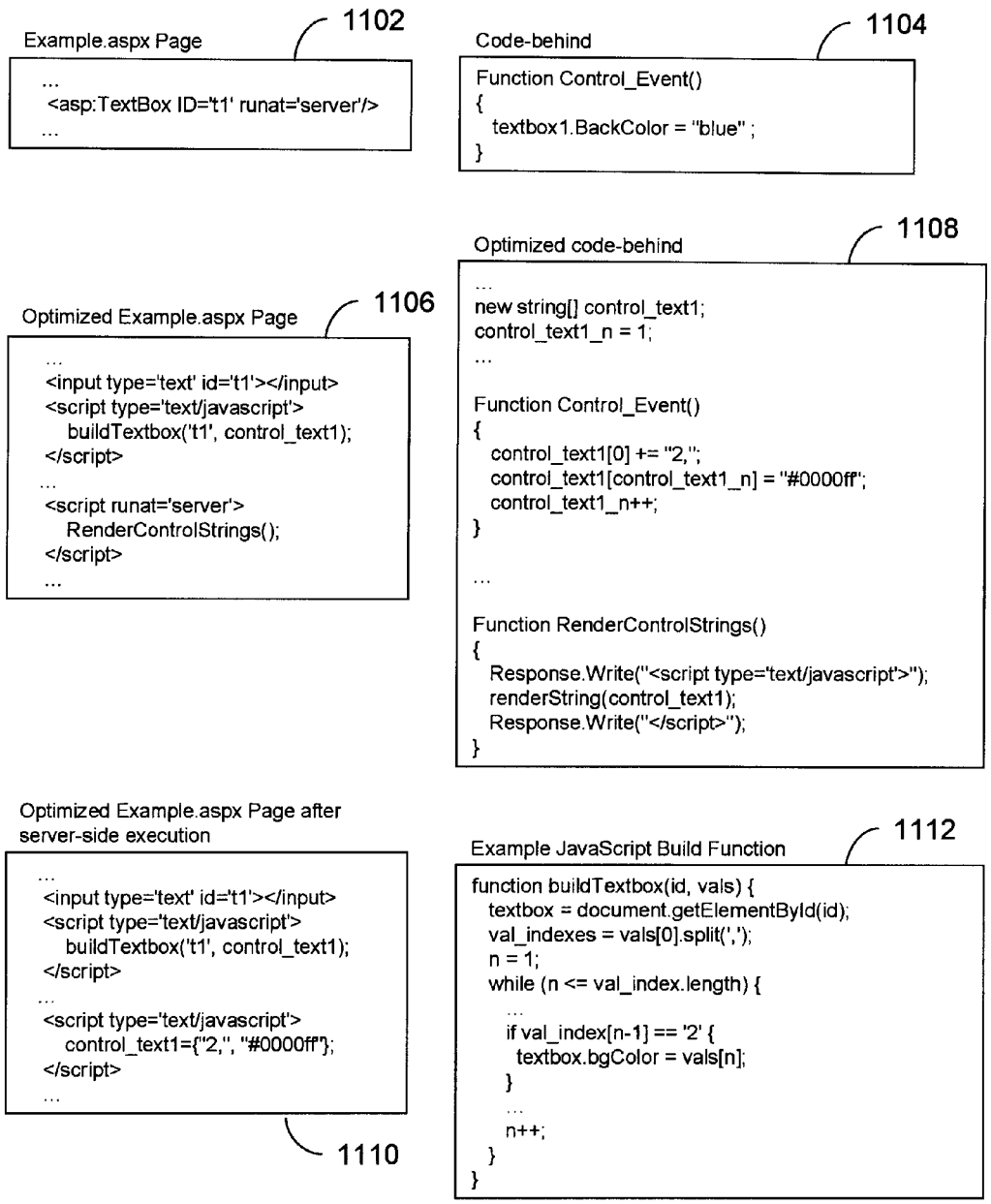
FIG. 11 illustrates exemplary code portions to further explain an alternate output format.

As noted above in the discussion of FIGS. 6 and 10, the output of an optimized control may be in an alternate format. This alternate format may then be processed by client-side code, such as a JavaScript routine, to produce HTML output for rendering in a web browser. FIG. 11 illustrates exemplary code portions to further explain an alternate output format. In the illustrated example, an original Example.aspx page 1102 includes an ASP.NET TextBox control identified as "t1." An associated code-behind 1104 defines a function that, when executed, sets the background color of the t1 TextBox to blue. It is understood that this is merely an example, and that more complex or sophisticated applications of the disclosed technology are also contemplated.

The Example.aspx page 1102 is replaced with an Optimized Example.aspx page 1106, and the associated code-behind 1104 is replaced with an optimized code-behind 1108. The Optimized Example.aspx page 1106 defines an HTML text input field having the same identifier as the ASP.NET TextBox control, "t1." The Optimized Example.aspx page 1106 also includes a call to a JavaScript function, buildTextbox( ), that will initiate the setting of certain settings for the t1 text input control when it is later produced by the receiving client. And an ASP.NET server-side script section is added to the Optimized Example.aspx page 1106 with a call to a RenderControlStrings( ) procedure.

Corresponding changes are made to the optimized code-behind 1108. The instructions contained in optimized code-behind 1108 is illustrated as being written using C# for the benefit of explanation, but it is understood that the optimized code-behind 1108 may be created as a compiled library using the Common Intermediate Language (CIL) as more fully explained below. A global string array variable, control_text1, and a global integer variable, control_text1_n, are defined. These two variables are used to store values assigned to attributes of the t1 text input during the server-side rendering of the Optimized Example.aspx page 1106. For example, the statement in the code-behind 1104 that sets the background color to blue is changed into a sequence of statements that will cause the equivalent output. Specifically, the $0^{th}$ index position of the control_text1 string array is used to store a sequence of property identifiers corresponding to control attributes. As illustrated in FIG. 8, the attribute for background color may be assigned the property identifier 2. Next, the other index positions of the control_text1 string array are used to store the assigned values. Thus, in the first position, the RGB value corresponding to the color blue, #0000ff, is stored. Then, the control_text1_n counter is updated so that a next attribute, if any, can be stored.

The optimized code-behind 1108 also provides a definition of the RenderControlStrings( ) procedure called by the Optimized Example.aspx page 1106. Specifically, the RenderControlStrings( ) procedure injects JavaScript variable definitions for the control_text1 variable used by the buildTextbox( ) function. An example of the output is shown as an Optimized Example.aspx page after server-side execution 1110. There, the server-side script has been replaced by a JavaScript code portion that defines the control_text1 variable as a string array with two strings.

Example JavaScript Build Function 1112 illustrates how the control_text1 string array may be interpreted to assign the desired attributes to a control, in this example a text input control. The string array's $0^{th}$ value is divided into its comma-delimited constituent identifiers. Then, for each of the constituent identifiers, the property associated with the identifier is set to the value of the associated string array index value. Thus, in the illustrated example, the first identifier in the control_text1 string array is 2, which corresponds to the background color attribute. The value of the corresponding control_text1 string array index position (in this case, index position 1, or "#0000ff") is thus assigned to that attribute. In this way, the t1 text input has its background color properly set to the color blue.

The example of FIG. 11 is understood to be merely one example of how one attribute on one type of control can be optimized. The technique can be applied to substantially any attribute and any control, and furthermore various functions and procedures used in the optimization can be reused across multiple controls.

As noted above with reference to FIGS. 6, 7, and 11, substituting an optimized control for a .NET control may require modifying instructions in an associated code behind. These changes could be accomplished by modifying the original code behind source code, but doing so requires access to the original code behind source code. In addition, the changes made to the code behind source code would generally depend on the programming language used by the code behind. Those of skill in the art will recognize that the changes needed for a Visual Basic code behind are different from those needed for a C# code behind.

An alternate approach is to make the necessary changes directly to a compiled dynamic link library (DLL) produced by the .NET compiler. The DLL includes instructions in a compiled format known as Common Intermediate Language (CIL) or Microsoft Intermediate Language (MSIL). The DLL instructions can be decompiled and modified using, for example, tools such as .NET Reflections and Mono Cecil. Suitable alternate tools can be employed when working with frameworks other than .NET.

Figure 12:
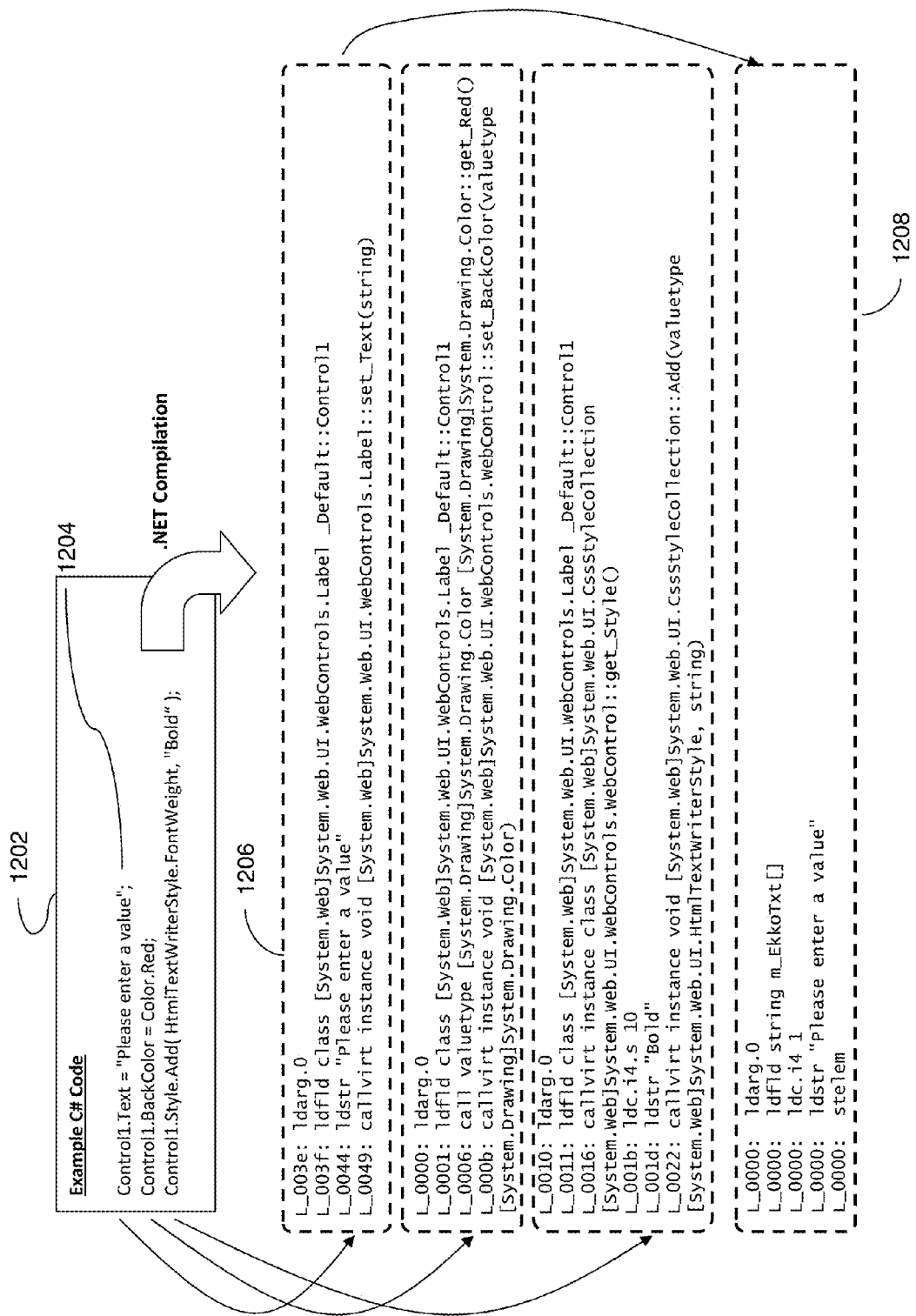
FIG. 12 illustrates an example approach to modifying a compiled CIL program.

FIG. 12 illustrates an example approach to modifying a compiled CIL program. Original C# source code 1202 includes a statement 1204 setting the background color of a Label control to red. After being compiled by the .NET compiler, the statement 1204 results in the instructions 1206. The instructions 1206 load the specific object instance of the Label, determine a value associated with the color red, and then assign that value to the object instance's BackColor property.

In accordance with the techniques of the present disclosure, the instructions 1206 can be rewritten as the optimized instructions 1208. The optimized instructions 1208 may, for example, correspond to one of the replaced lines of code in the optimized code behind 702 of FIG. 7.

Figure 18:
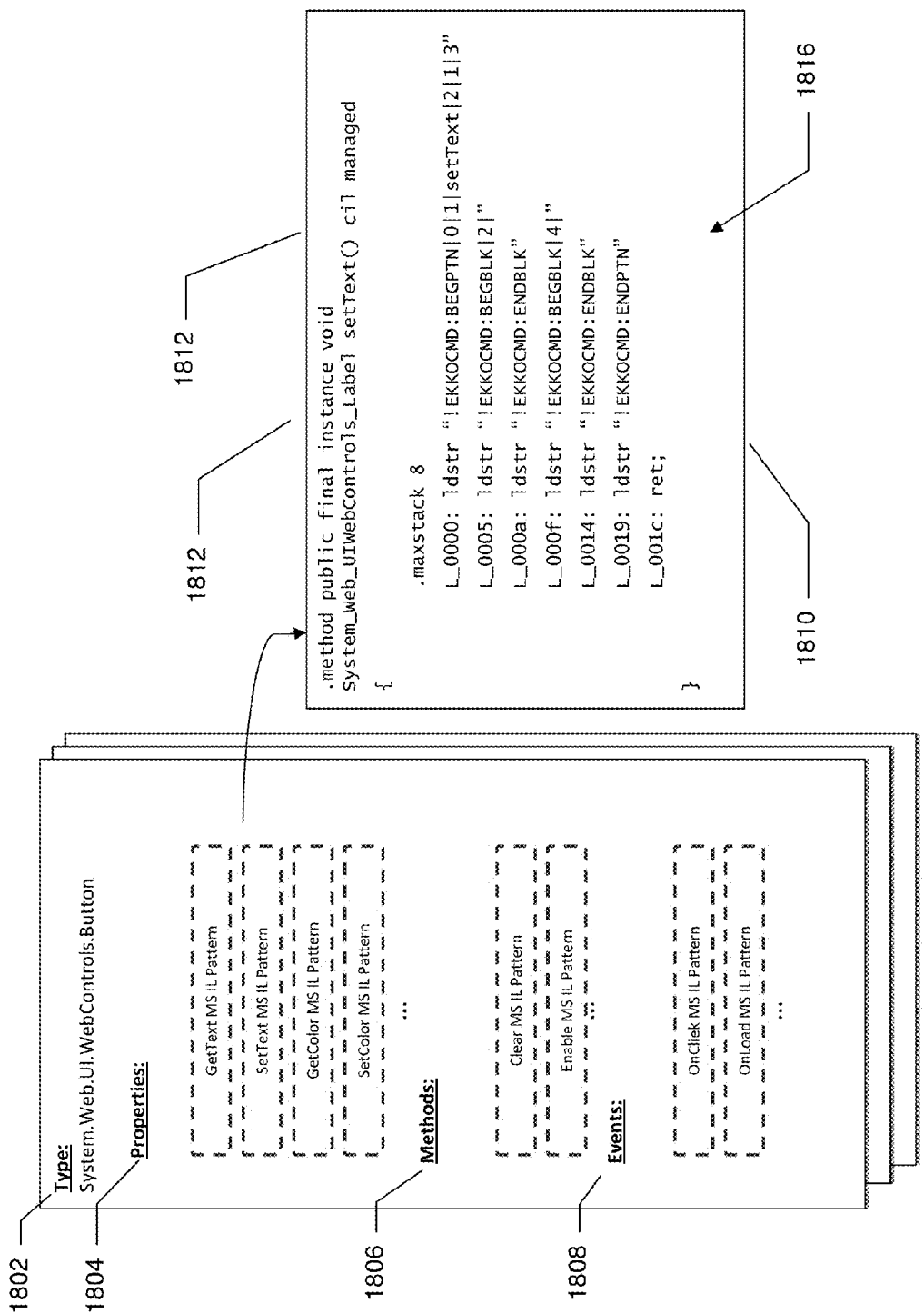
FIG. 18 illustrates a database format for storing details about supported controls.

FIG. 19 illustrates an example approach to modifying a compiled CIL program. The example of FIG. 19 builds on the previous disclosure of FIG. 12. The compiled instructions 1206 are matched against a pattern 1902. The pattern 1902, which may be stored in the database format described in FIG. 18, represents an instruction set that includes a first block 1904 and a second block 1906, although more or fewer blocks are also contemplated. The number of blocks may depend on the specific control property, method, or event being invoked or referenced by the instructions 1206.

The first block 1902 includes a wild card portion 1908 that corresponds to a location in the instructions 1206 where a variable name occurs. Since variable names are assigned by the programmer, they cannot be predicted in advance and the optimization process must take into account that a variable name will change from one application to another, or that multiple variables with different names may be used in a single application. The first block 1902 also includes an object type portion 1910. The second block 1906 includes a base class type portion 1912, which may be the same as or different than the object type portion 1910. The second block 1906 also includes a function signature portion 1914 that identifies a method or function of the base class.

Between the first block 1904 and the second block 1906 are a number of lines, n, that are variable depending on the complexity of the supporting code. The n lines may also include other instruction sets. Thus, instructions sets may be nested inside other instruction sets. Because instruction sets may be nested, it is not always apparent where an instruction set begins or ends.

Figure 20:
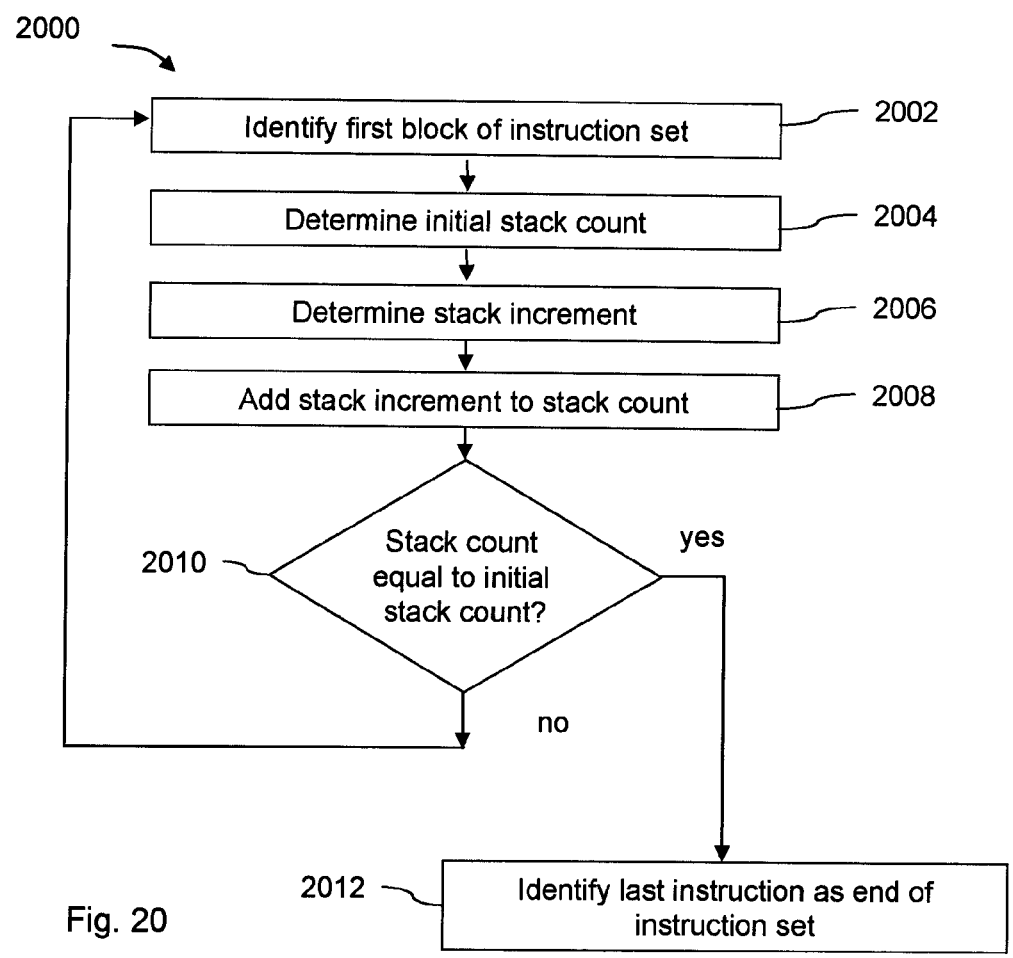
FIG. 20 illustrates a process for identifying a beginning and an end of an instruction set.

FIG. 20 illustrates a process for identifying a beginning and an end of an instruction set. The process implements a stack trace algorithm that evaluates the stack count value by determining how each instruction affects the stack count. IL instructions can either add items to the stack, pop items from the stack, or evaluate items on the stack without affecting the stack count. In step 2002, the first block of an instruction set is identified, for example, by a "ldarg.0" instruction followed by an object type and ID. In the example of FIG. 19, this corresponds to an object type of System.Web.UI.WebControls.Label with the name Control1. Next in step 2004, an initial stack count is determined. In the example of FIG. 19, the stack count begins with 2, but the beginning stack count can be any value depending on its location in the IL code. Then in step 2006, the stack increment of the next instruction is determined. In the example of FIG. 19, the next instruction is the "ldfld" instruction with a stack increment of +1 because the instruction adds one item to the stack. Although described as a stack increment, it is understood that the stack increment value may be positive, negative, or zero. In step 2008, the stack increment is added to the stack count, resulting in a stack count of 3 in the example. Then in step 2010, the current stack count (3) is compared to the initial stack count (2). If the current stack count equals the initial stack count, processing continues to step 2012, where the last instruction is identified as the end of the instruction set. If in step 2010 the current stack count does not equal the initial stack count, then processing loops back to step 2006.

As shown in the example of FIG. 19, the "callvirt" instruction has a stack increment of −2 because it pops two items off the stack. This results in the current stack count equaling the initial stack count and indicates that the "callvirt" instruction is the end of the instruction set that begins with the "ldarg.0" and "ldfld" statements.

After an instruction set is identified using the process of FIG. 20, the object type, base class type, and function signature can be identified as shown in FIG. 19. These values and the instruction set are used to query the pattern database for a matching result. The .NET Reflection tool may be used to query the pattern database, which may be implement in pure IL with the patterns created as IL blocks. An example IL block pattern is shown in FIG. 18 as pattern 1810. The pattern 1810 corresponds to the base class type and function signature of the IL instructions in the example of FIG. 19. Thus, the optimization process retrieves the pattern 1810 from the pattern database and extracts the instructions therein to replace the IL instructions of FIG. 19. In the specific example of pattern 1810, there is an object type 1812 ("System_Web_UI-WebControls_Label"), function signature 1814 ("setText( )"), and optimization command and associated block descriptions 1816. As previously noted, each pattern may have more or fewer blocks. The optimization command or commands may be to ignore, verify, replace, or type change the original instructions. In most instances, the optimization command will be to replace the original IL instructions with optimized counterparts. The optimized counterparts may be optimized relative to the original IL instructions in a variety of ways, including, for example, that the optimized counterparts execute faster, require less memory, access fewer resources, or produce output that requires less time to transmit over a network.

Figure 21:
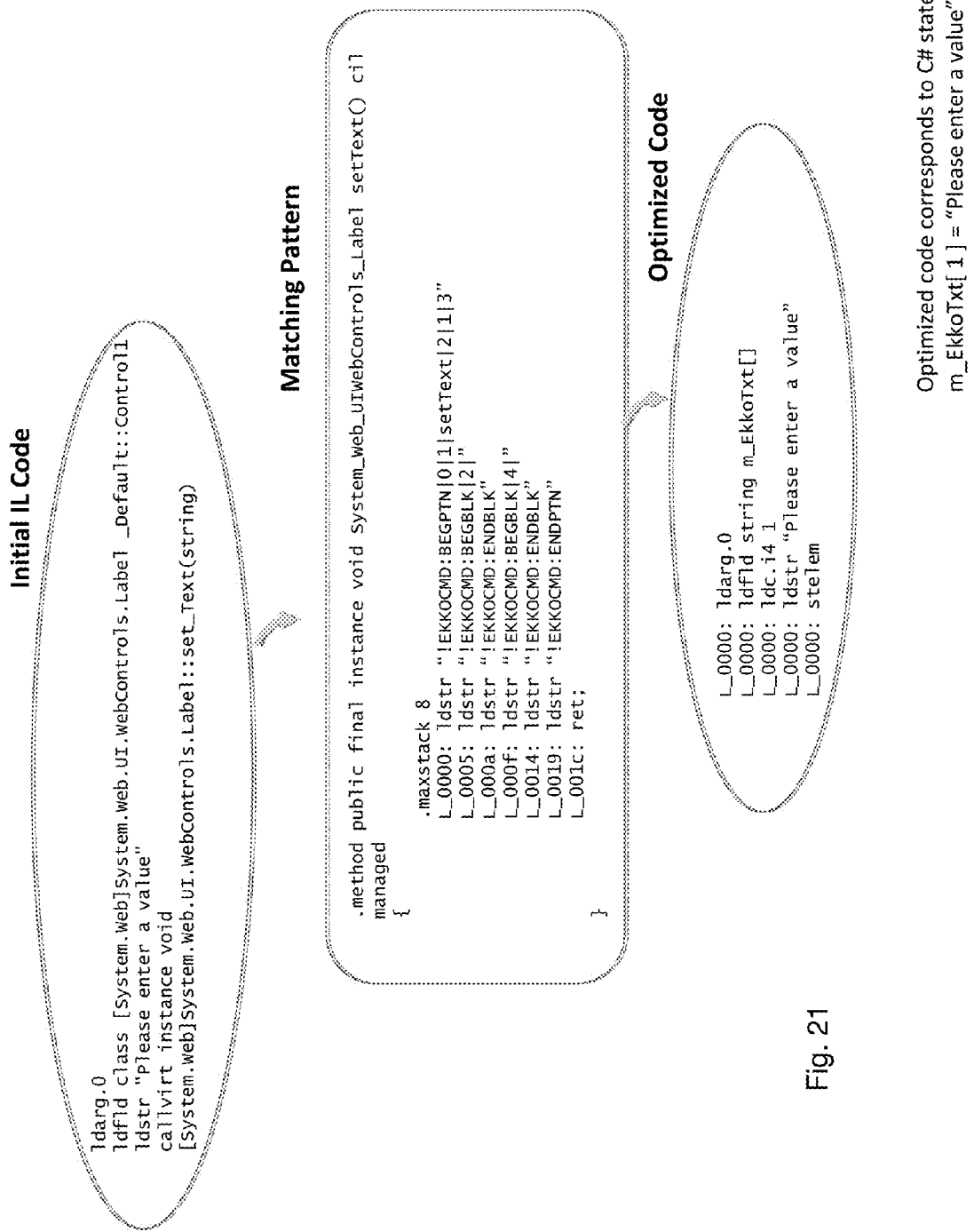
FIG. 21 illustrates a progression of optimizing an instruction.

FIG. 21 illustrates a progression of optimizing an instruction. The initial compiled IL code 2102 is matched to a pattern 2104. The pattern 2104 is evaluated to provide replacement optimized instructions 2106. For example, the replacement instructions 2106 are substantially equivalent to the C# statement, "m_EkkoTxt[1]='Please enter a value';".

From the example explained in detail above, it can be appreciated that instructions for setting or getting substantially any property for substantially any .NET control can be readily replaced with optimized instructions that access the relevant properties using the control string techniques of the present disclosure. Given that many .NET controls have few or no methods or events other than those for getting and setting properties, these .NET controls can be replaced with corresponding optimized controls that provide equivalent or the same functionality. To do so, it is appreciated that one approach is to build a database of generic templates of instructions and optimized templates of instructions, as generally discussed above with respect to FIG. 12. The library preferably should include templates corresponding to each supported property or attribute of each supported control object class.

Figure 13:
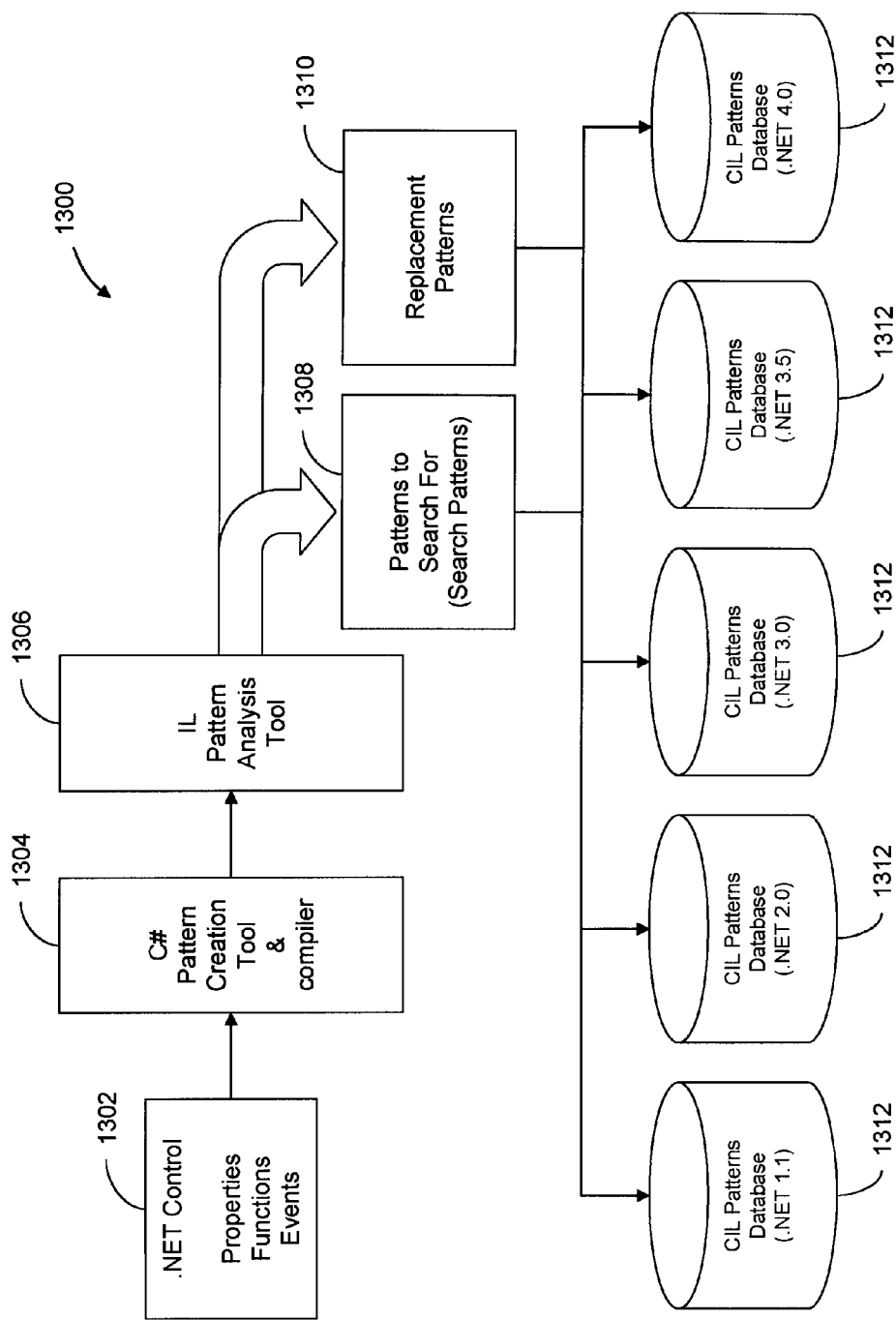
FIG. 13 illustrates a system for building a database of instruction templates.

FIG. 13 illustrates a system 1300 for building a database of instruction templates. The system 1300 includes a control 1302 that is input to a pattern creation tool 1304. The pattern creation tool 1304 introspects the control 1302 to determine its properties, functions, and events. The pattern creation tool and compiler 1304 then generates and compiles example source code to activate some or all of these properties, functions, and events. The generated source code may be, for example, C# source code or Visual Basic source code. The source code is then compiled to produce a generic form of IL that is analyzed by an IL pattern analysis tool 1306 to identify one or more IL instructions for that correspond to each property, function, or event. The one or more IL instructions are used to generate an IL statement pattern 1308 for each corresponding property, function, or event. The IL statement pattern may include a portion that matches against a wildcard, for example, for matching against a variable name. For each identified pattern, a replacement pattern 1310 is also provided. These search patterns and replacement patterns are then stored in a database 1312. The database may be an IL dynamic link library (DLL), thus allowing .NET Reflection to be used to read and to search the patterns. Since the properties, functions, and events associated with a control may change with each version of the .NET framework, separate databases 1312 may be created for each supported version of the .NET framework.

The system 1300 may operate automatically, allowing a large number of controls to be quickly analyzed. The system 1300 may also operate semi-automatically, such that a user guides and oversees the system's operation but some aspects remain automatic.

To handle some events, such as an OnChange event triggered by a user changing the value of a control object, the initial values of optimized control objects may be stored in a hidden field inserted into a rendered web page. When a client sends a subsequent request, such as HTTP POST message, the value of the hidden field will be included in the POST message. Thus, during processing of the POST message, the initial values (retrieved from the hidden field) may be compared to the then-current values (also provided in the POST message) to determine if a field value has changed. If so, the associated OnChange event is triggered. Other events can be handled in a similar fashion.

FIG. 18 illustrates a database format 1800 for storing details about supported controls. The database format 1800 may be used, for example, to organize data stored in databases 1312. The database format 1800 includes a type value 1802 to indicate a control, which may be a specific control or a class of controls. For a type value 1802, the database format 1800 includes properties 1804, methods 1806, and events 1808. Although described using the plural sense, it is not required that a type value 1802 have multiple properties 1804, methods 1806, and events 1808. Thus, it is understood that a type value 1802 may alternately have zero or more properties 1804, methods 1806, and events 1808. For each property 1804, the database format 1800 stores a pattern that matches an IL statement pattern generated by code accessing the corresponding property of the type 1802. The methods 1806 and events 1808 are similarly organized. The database format is organized to allow multiple records to be efficiently stored and searched, thus supporting the code optimization processes described herein.

The optimization technology of the present disclosure can be readily integrated with the optimization technology described in the applicants' co-pending U.S. application Ser. No. 12/477,416, "Web Page Optimization," filed Jun. 3, 2009, the contents of which are hereby incorporated by reference for all purposes. Thus, after replacing ASP.NET controls with HTML equivalent controls, as discussed generally above with respect to FIG. 12, the replacement HTML equivalent controls are defined by server-side static code that can optionally be compressed.

Figure 14:
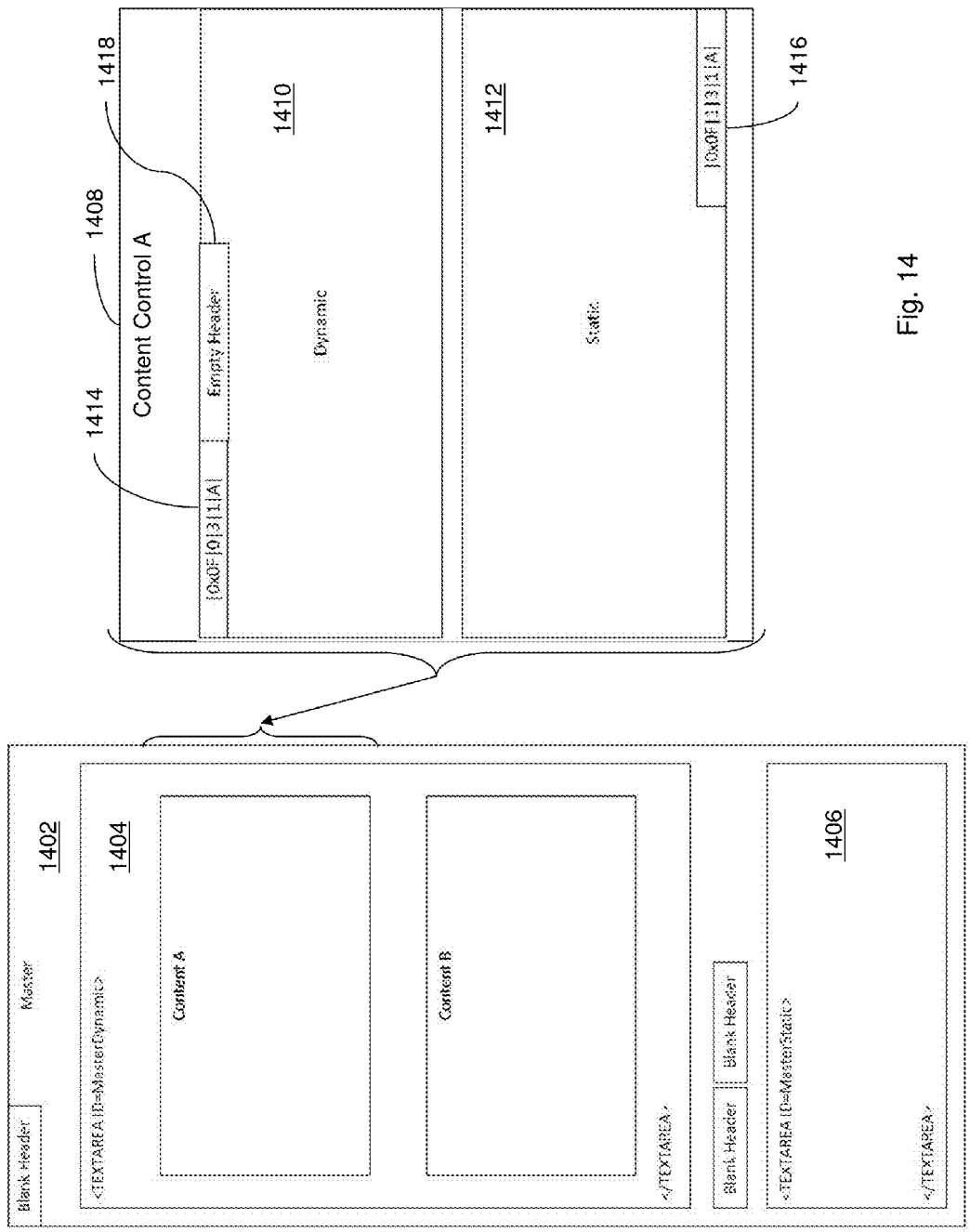
FIG. 14 illustrates an example of how pages can be optimized when they inherit attributes and content from a master page.

It is noted that ASP.NET applications can use a concept known as a Master Page that defines attributes and content that are inherited by one or more other pages. FIG. 14 shows an example of how pages can be optimized when they inherit attributes and content from a master page. An ASP.NET master page 1402 includes a dynamic portion 1404 and a static portion 1406. Within the dynamic portion 1404 there is a content placeholder that can contain, for example, either content control A or a content control B. Illustrated is the content control A 1408, which is also divided into a dynamic portion 1410 and a static portion 1412. The dynamic portion 1410 begins with an identifier 1414, and the static portion 1412 ends with a corresponding identifier 1416. As illustrated, the identifiers 1414 and 1416 each have a length of 5 bytes, but it is understood that the identifiers may be longer or shorter, and they may be of unequal length. Part or all of an identifier may identify a file or other data store, either directly or indirectly, that includes additional information for processing the content control. A separate data store, not shown, may store additional information, such as the location of escape sequences or characters that must be replaced before the content is provided to a requester. As illustrated, the identifiers 1414 and 1416 each begin with the control byte value 0x0F, which is treated as a reserved byte value that indicates the beginning of a header or footer identifier. The next byte has a value of either 0 or 1. The value 0 indicates that the identifier is a header identifier marking the beginning of a portion, and the value 1 indicates that the identifier is a footer identifier marking the end of a portion. The next three bytes or characters represent an alphanumeric identifier, which in the illustrated example is 31A. It is understood that identifiers may be structured differently and may have or use any suitable format. The dynamic portion 1410 also includes an empty header 1418, which may be subsequently populated as a GZIP, zlib, or other compression block header.

Figure 15:
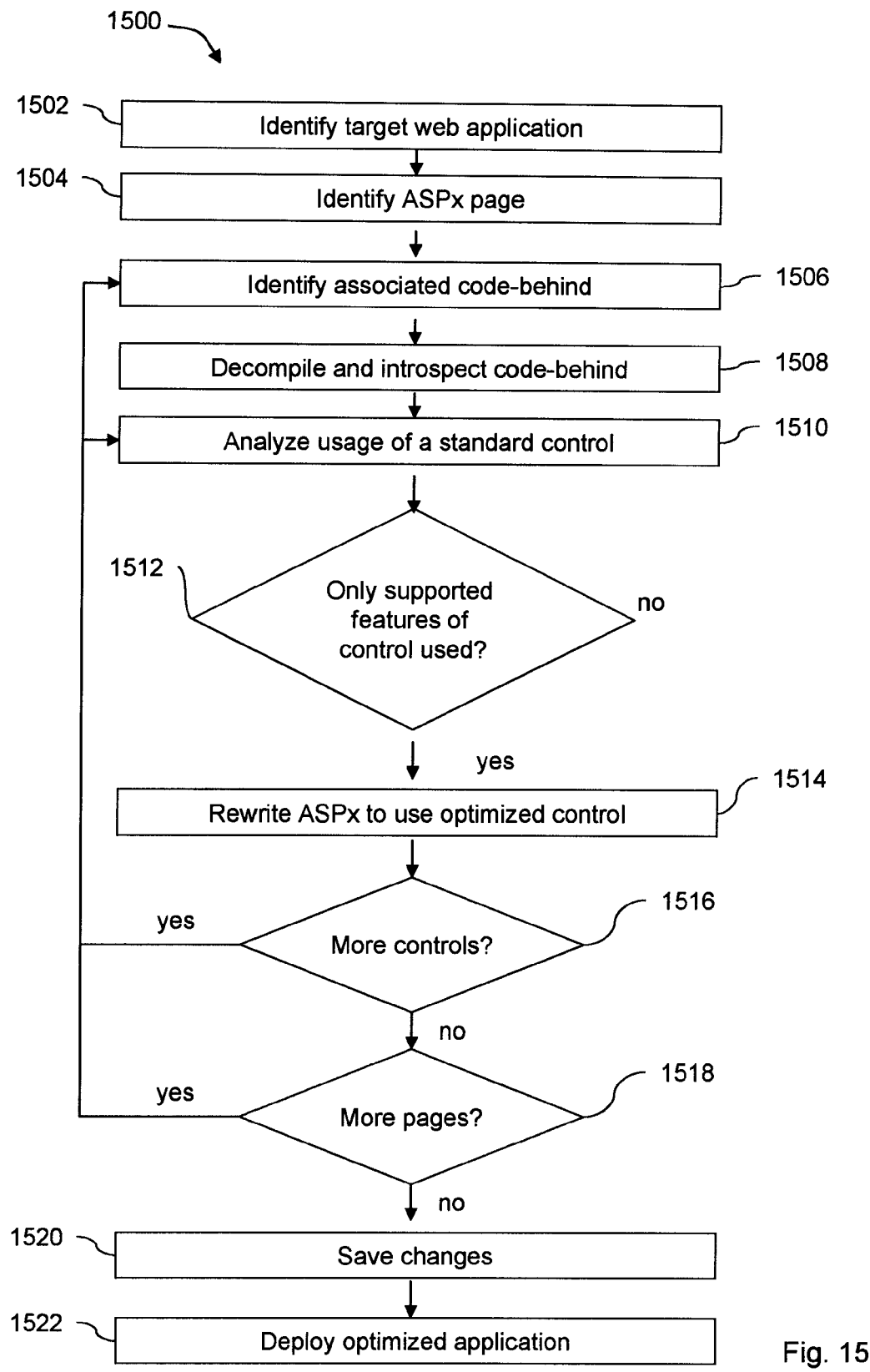
FIG. 15 illustrates a process for optimizing a web application.

FIG. 15 illustrates a process 1500 for optimizing a web application. Although the process 1500 is illustrated and described herein with respect to an ASP.NET web application, it is understood that the web application may use any suitable framework. The process 1500 begins in step 1502 with identifying a target web application. The target web application may be an entire web site, or just a portion thereof, for example, a single web page. Continuing in step 1504, an original ASPx page is identified. Then in step 1506, the code-behind associated with the ASPx page, if any, is identified. In step 1508, the compiled code-behind code is decompiled and introspected along with the ASPx page. Because all .NET code compiles to a Common Intermediate Language (CIL) format, processing the compiled code-behind code allows the process 1500 to operate independently of whatever language the code-behind was originally written in. For example, it does not matter for the process 1500 whether the code-behind was written using Visual Basic or C#. The decompilation of step 1508 may be accomplished using, for example, the Reflections toolset that is provided as part of ASP.NET or the Cecil library available as part of the open source Mono project. As an alternative to decompilation, the code-behind may be analyzed in its original source code format. As yet another alternative, a custom execution environment can be created for executing the code-behind in a controlled environment that records the actions caused by executing the code-behind.

Then in step 1510, an analysis is made of the objects, methods, properties, and events are used in the code-behind. This analysis may be directed to determining if any ASP.NET server controls are modified or used in the code-behind. Examples of modification or use include if the contents of an object or its properties are changed, if a control triggers a postback event, or if an object is passed as a parameter in a method call. As a specific example, where the ASPx page uses a GridView control, the introspection may include determining how the methods, properties, and events of that GridView control are used.

In step 1512, a decision is made based on the analysis from step 1510 as to whether the ASPx page and associated code-behind use only the subset of features supported by an optimized replacement control. If only supported features are used, then in step 1514 the ASPx page is rewritten to use the optimized replacement control instead of the original control. If unsupported features are used, then processing continues to step 1516.

In step 1516, a determination is made whether there are additional controls to be analyzed. If so, then processing returns to step 1510 to handle the next control. If there are no more controls, then processing continues to step 1518.

In step 1518, a determination is made whether there are additional ASPx pages to be processed. If so, then the next page is identified and processing continues to step 1510 to process it. If there are no more pages, then processing continues to step 1520. In step 1520, the changes made in the process 1500 to the web application are saved. As an alternative, the changes may be saved as they are made throughout the process 1500. The changes may be saved to a new location so that the original files associated with the web application are not disturbed. Finally in step 1522, the updated web application is deployed. The application may be deployed to a test or production environment.

Figure 16:
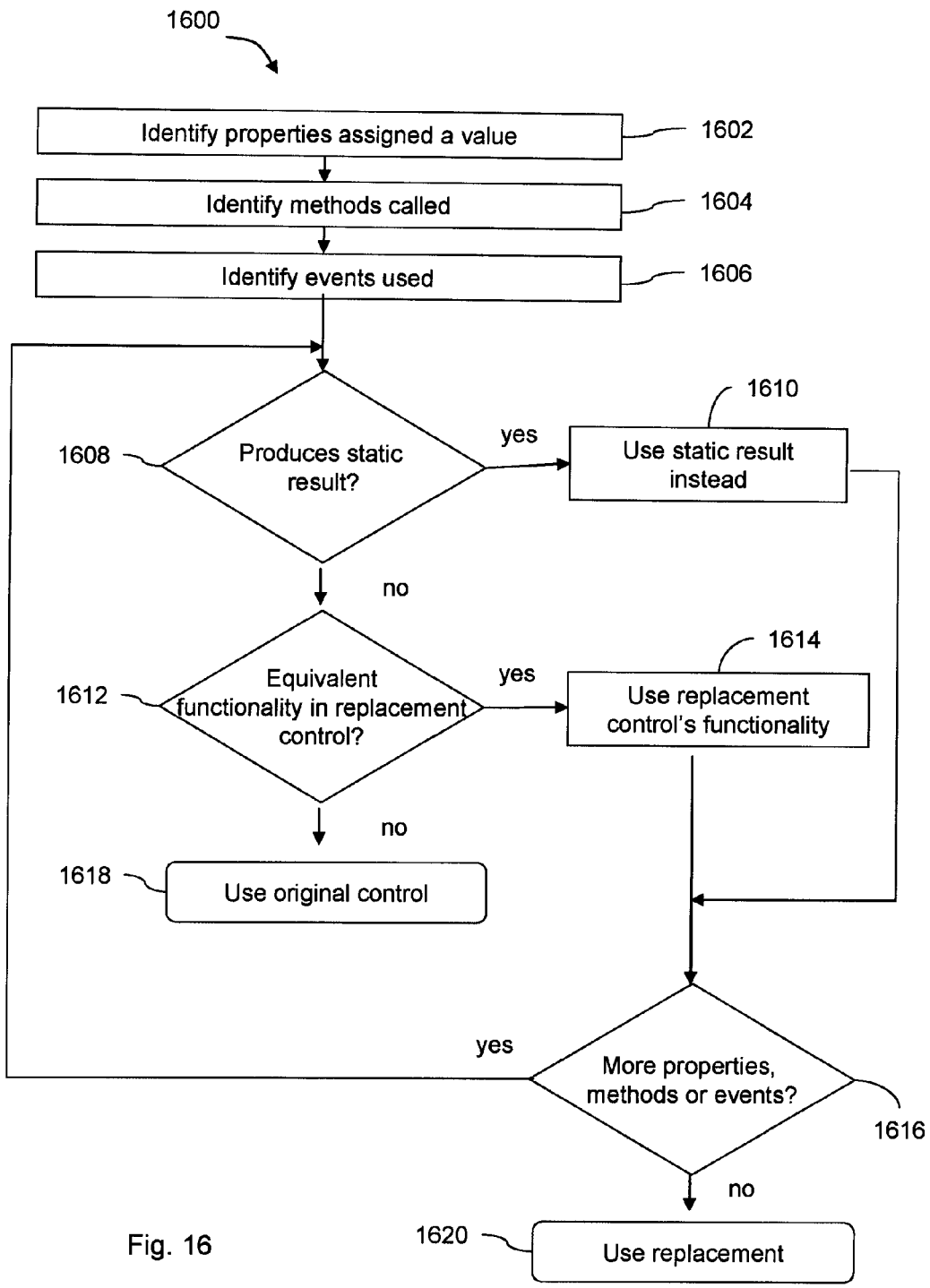
FIG. 16 illustrates a process for analyzing usage of a control object that is part of an application.

Turning now to FIG. 16, illustrated is a process 1600 for analyzing usage of a control object that is part of an application. The process 1600 may be used, for example, as part of the process 1500. The process 1600 begins in step 1602 with identifying the control's properties that are assigned values by the application. Then in step 1604, the control's methods called by the application are identified. In step 1606, the control's events that cause the execution of application logic are identified. In summary, steps 1602-1606 identify substantially all of the ways that the application uses the control under analysis.

The process 1600 then continues with determining a functionally equivalent technique for creating each of the control's properties, methods, and events used by the application. In step 1608, it is determined whether a property, method, or event results in a static result. For example, the control may have a color property set to a fixed color and that produces an in-line CSS command or HTML tag property. The determination of step 1608 may be made for each property, method, and event separately, or they may be considered in groups or as a whole. For example, an entire asp:Menu structure and its constituent sub-objects may be evaluated together as a group. If in step 1608 it is determine that the result is static, then in step 1610 the static result can be used in place of the property, method, or event. The static result may be a portion of text, such as HTML, Javascript or other code. The static result may also be a visual styling command, such as a portion of CSS code.

If in step 1608 it is determined that the property, method, or event does not produce a static result, then in step 1612 it is determined whether a replacement optimized control provides a functionally equivalent property, method, or event. If so, then the functionally equivalent property, method, or event is used in step 1614. The replacement optimized control may include executable code that will execute on the server, on the client, or on an intermediary network node. For example, the replacement optimized control may be another object or group of objects or a Javascript routine or portion thereof.

Then in step 1616, it is determined whether there are any further properties, methods, or events to be analyzed. If so, then processing returns to step 1608 to handle the next property, method, or event. If not, then processing ends in step 1620 by using the replacement controls and/or static results.

If in step 1612 it is determined that a replacement optimized control does not provide a functionally equivalent property, method, or event, then the original control will not be optimized and the process ends in step 1618.

Figure 17:
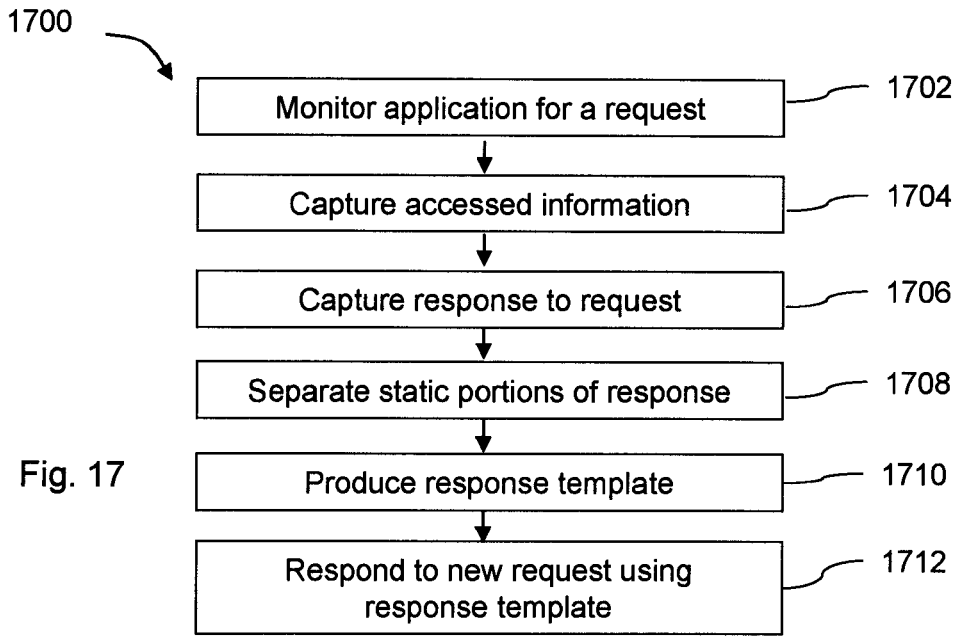
FIG. 17 illustrates an alternate approach for optimizing an application.

Turning now to FIG. 17, illustrated is another approach for optimizing an application. The process begins in step 1702 with monitoring the application for a request from a client. Then in step 1704, the process continues with capturing the information dynamically accessed by the application in response to the request. The information may be, for example, one or more records from a database associated with the application. Next in step 1706, the application's completed response to the request is captured. Steps 1702 to 1706 may optionally be repeated multiple times to produce multiple captured examples of access information and their associated completed responses.

In step 1708, the response and accessed information are analyzed to identify which parts of the response were formed using the dynamically accessed information, and conversely, which parts of the response were formed from substantially static data. Thus, this analysis step allows the substantially static portions of the response to be identified and separated from the complete response. Next in step 1710, a response template is produced. The response template incorporates the substantially static data along with placeholder identifiers that indicate where each item of dynamically access information was found in step 1708. The placeholder identifiers, either alone or in combination with a data map, indicate the relevant data source for each item of dynamically access information. For example, the placeholder identifier or an associated data map may indicate that a certain field is to contain a user's name as stored in a field on a table in the database.

Next in step 1712, a new request is received and responded to using the response template generated in step 1710. Because only the dynamically access information needs to be accessed and processed, and because the remainder of the response is known to be substantially static, the computation burden on a server responding to the new request is dramatically lower.

Figure 22:
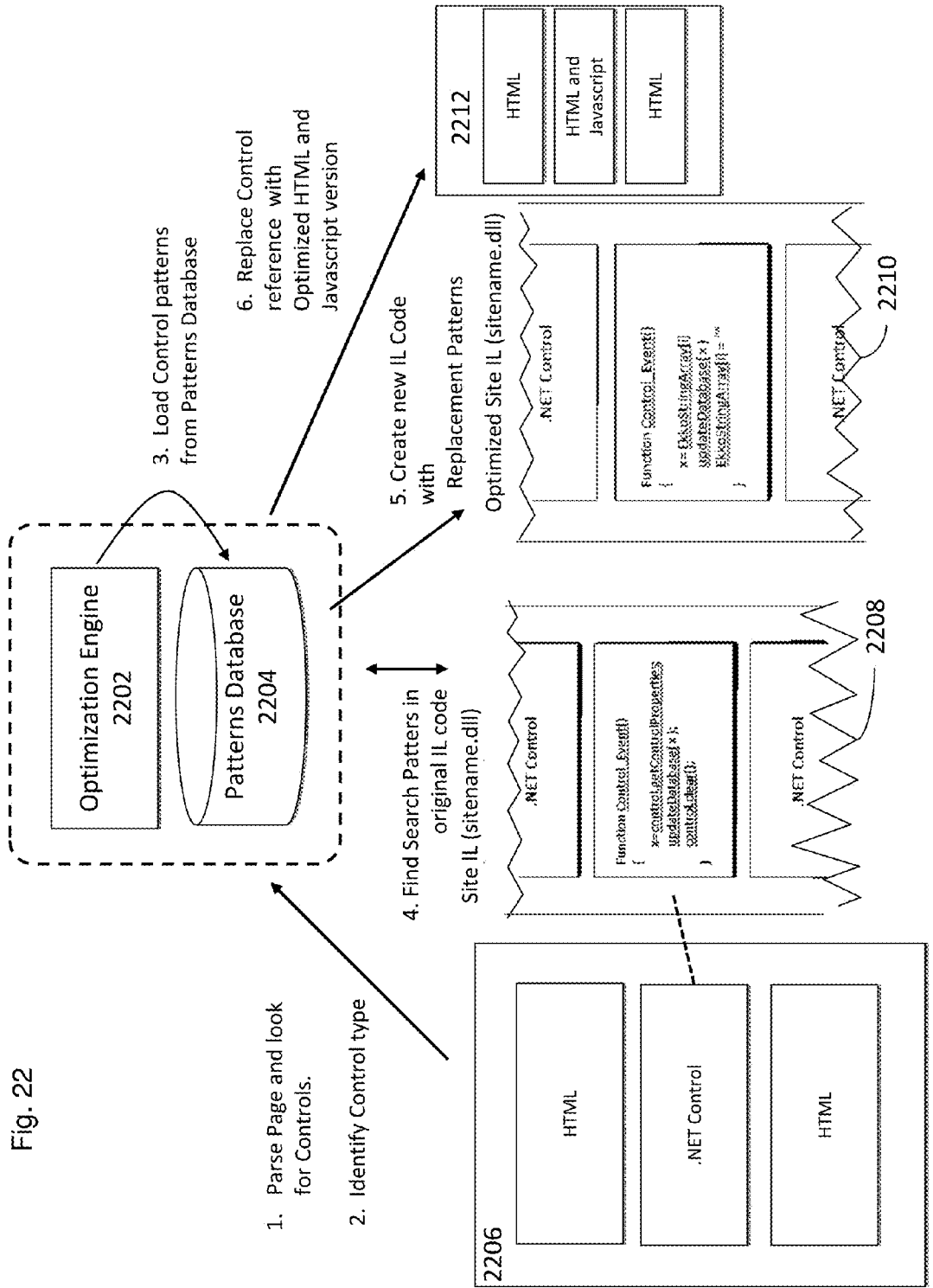
FIG. 22 illustrates an application optimization system and process.

FIG. 22 illustrates an application optimization system and process. The system includes an optimization engine 2202 and associated pattern database 2204. Although illustrated as a single database, it is understood that the pattern database 2204 may include multiple databases. A target web application includes a web page 2206 and code-behind 2208, although the application may of course include many web pages and code-behinds. The optimization engine 2202 parses the web page 2206 to locate and subsequently identify any controls or objects used there. The optimization engine 2202 then loads instruction patterns from the pattern database 2204. Next the optimization engine 2202 searches for matching patterns in the code-behind 2208. Using information from the pattern database 2204, the optimization engine then replaces instructions in the code-behind 2208 to produce an optimized code-behind 2210. The optimization engine also replaces controls in the web page 2206 to produce an optimized web page 2212.

FIG. 23 illustrates an example of optimizing a control. A web page portion 2302 includes a statement declaring a button with ID btnContinue, a text label of "Continue . . . ", a width of 200 and a color blue. An associated code behind segment 2304 modifies the button's height to 30 and sets the font to Arial. An optimized web page portion 2306 includes a button declaration as a standard HTML control. The optimized web page portion 2306 also defines a hidden HTML element that contains values representing button properties that are set dynamically. Finally, the optimized web page portion 2306 includes a Javascript portion to be executed on the client side to call a buildButton( ) function that accepts as arguments two control IDs. The first control ID specifies the optimized control and the second control ID specifies the hidden HTML element that contains dynamic properties for the optimized control. The Javascript function may be specific to the particular control being optimized. Alternatively, the function may be common to multiple controls and may accept an additional parameter indicating the type of control to be built.

The hidden HTML element encodes dynamic properties using comma separated values. Other encoding approaches may also be used instead of or in addition to comma separation. The first value specifies the total number of dynamic properties, in the example case, 2. Since there are 2 dynamic properties, the next 2 values specify index values that identify the specific properties. In the example case, the value 4 indicates that the dynamic property is the height, and the value 30 indicates that the dynamic property is the font. Next, the values of the properties are provided. In the example case, the height is set to the value 30 and the font is set to the value arial.

FIG. 24 illustrates another example of optimizing a control. The example begins with the same web page portion 2302 and associated code behind segment 2304 as in the example of FIG. 23. An optimized web page portion 2406 includes two hidden HTML elements, one for statically defined properties and a second for properties that are set dynamically. The optimized web page portion 2406 also includes a Javascript portion to be executed on the client side to call a buildButton( ) function that accepts as arguments three control IDs. The first control ID specifies the control ID to be created, the second control ID specifies the hidden HTML element that contains static properties for the optimized control, and the third control ID specifies the hidden HTML element that contains dynamic properties for the optimized control. The hidden HTML elements encode the control properties using the approach described above in FIG. 23.

It is particularly noted that a substantial portion of the optimized web page portions 2306 and 2406 is static. Only the dynamic values assigned during execution of the code-behind are non-static. Thus, the remaining static portions can be further compressed and optimized using the optimization technology described in the applicants' co-pending U.S. application Ser. No. 12/477,416.

Figure 25:
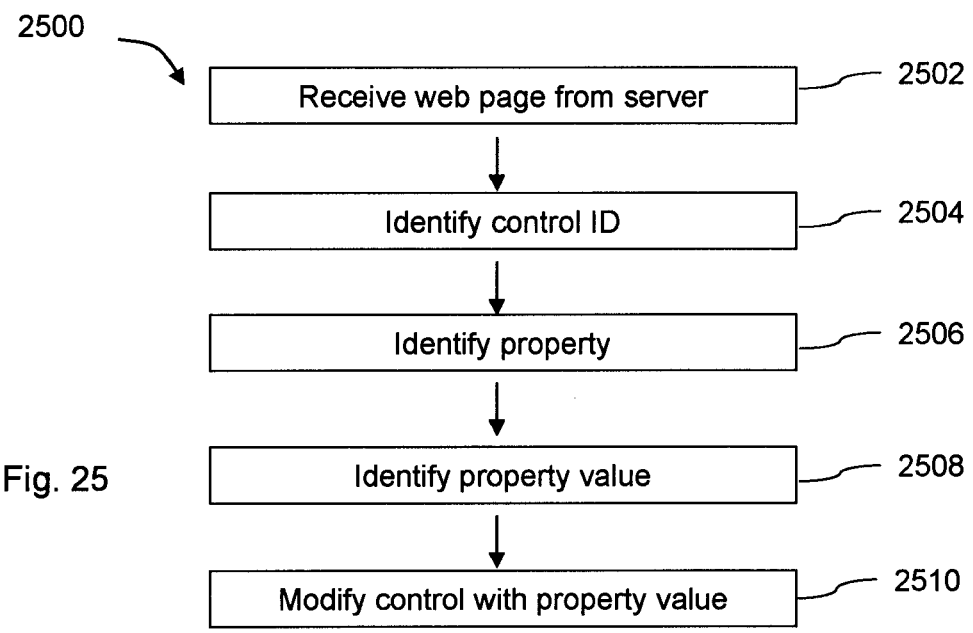
FIG. 25 illustrates a process for rendering a web page.

FIG. 25 illustrates a process for rendering a web page. The process 2500 may be used, for example, to render a web page on a client computer system when the web page includes a web page portion that has been optimized using the techniques discussed herein. Any individual step, or the even the entire process, may be performed as part of a Javascript or other programming language routine. The process 2500 begins at step 2502 with receiving a web page from a server, which may be local or remote. Receiving the web page from the server may include a sub-step of decompressing some or all of the web page content. For example, the web page may be received from the web server in a GZIP format that requires decompression. Next in step 2504, the web page is parsed to identify a control ID. The control ID may identify, for example, an HTML control that is declared and instantiated elsewhere in the web page. The control ID may also identify an HTML or other kind of control that is to be instantiated. If the control does not exist and is to be instantiated, the step 2504 may optionally include the substep of instantiating a control with the identified control ID. Alternatively, the control may be instantiated later in the process when further details about the control's property or properties have been extracted from the web page. Then in step 2506, a data array in the web page is parsed to identify an associated property to be set for the control. The data array may be, for example, a string array of comma separated values, although other approaches and data structures for identifying a property are also contemplated. The property may be identified by an index value, such as the index values discussed previously with respect to FIG. 8. Next in step 2508, the data array in the web page is parsed to identify a property value for the property. Although it is contemplated that the data array of step 2508 is the same data array of step 2506, this is not necessarily so. The property value may have been dynamically determined by the server during the preparation of the web page. For example, the property value may depend in part on information provided to the server when requesting the web page or on information associated with a user. As described in applicants' co-pending U.S. application Ser. No. 12/477,416, the dynamically determined property value may be received from the server in an uncompressed format, even though other parts of the web page are received in a compressed format. Finally in step 2510, the control is modified to set the property to the property value. The process 2500 may also continue by iterating over additional properties and property values in the data array or arrays. For example, the process 2500 may include processing two separate data arrays like those illustrated in FIG. 24.

This disclosure is described in the context of requesting and serving web pages over a network as part of a Microsoft ASP.NET web application. But those of skill in the art will recognize that the present disclosure may be used in other contexts. For example, the technology may be used within a single computer without the requirement of a network. As another example, the disclosed techniques may be applied to documents other than web pages, such as interpreted or compiled scripts or programs, XML documents, database records, or any other kind of document. As a further example, the disclosed techniques may be applied to applications using other frameworks, including but not limited to Java, IBM WebSphere, and Adobe ColdFusion.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A computerized method comprising:
    requesting a resource;
    receiving a response including a user interface control declaration and a data array containing properties for the user interface control;
    parsing a first property value in the data array;
    modifying a property of the user interface control corresponding to the first property value.

2. The method of claim 1 further comprising iterating over the data array.

3. The method of claim 1 further comprising parsing a first property index in the data array, wherein the first property index is associated with the first property value.

4. The method of claim 1 further comprising decompressing the response.

5. The method of claim 1 wherein the user interface control is an HTML control.

6. The method of claim 1 wherein the modifying step comprises executing a Javascript function.

7. The method of claim 1 wherein the data array comprises properties determined dynamically depending at least in part on information provided in the requesting step.

8. The method of claim 1 wherein the data array comprises properties determined dynamically depending at least in part on information associated with a user.

9. The method of claim 8 wherein a portion of the response is compressed but the properties determined dynamically are not compressed.

* * * * *